United States Patent
Fang et al.

(10) Patent No.: US 9,480,013 B2
(45) Date of Patent: Oct. 25, 2016

(54) METHOD, DEVICE, AND SYSTEM FOR JOINING NEIGHBOR AWARENESS NETWORK CLUSTER

(71) Applicant: Huawei Device Co., Ltd., Shenzhen, Guangdong (CN)

(72) Inventors: Ping Fang, Shenzhen (CN); Ji Chen, Shenzhen (CN); Zhiming Ding, Shenzhen (CN); Zhenguo Du, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 66 days.

(21) Appl. No.: 14/570,429

(22) Filed: Dec. 15, 2014

(65) Prior Publication Data
US 2015/0098388 A1    Apr. 9, 2015

Related U.S. Application Data

(63) Continuation of application No. PCT/CN2014/074887, filed on Apr. 8, 2014.

(30) Foreign Application Priority Data

Aug. 13, 2013    (CN) .......................... 2013 1 0351937

(51) Int. Cl.
*H04W 4/00* (2009.01)
*H04W 48/18* (2009.01)
(Continued)

(52) U.S. Cl.
CPC ............. *H04W 48/18* (2013.01); *H04W 48/16* (2013.01); *H04W 84/18* (2013.01)

(58) Field of Classification Search
CPC ........................... H04W 48/16; H04W 48/18

USPC ........................................................ 370/390
See application file for complete search history.

(56) References Cited

U.S. PATENT DOCUMENTS

| 8,189,494 B2 | 5/2012 | Budampati et al. |
| 2006/0040701 A1 | 2/2006 | Long et al. |

(Continued)

FOREIGN PATENT DOCUMENTS

| CN | 102647771 A | 8/2012 |
| CN | 102695220 A | 9/2012 |

(Continued)

OTHER PUBLICATIONS

"Wi-Fi Neighbor Awareness Networking (NAN), Wi-Fi NAN Technical Specification Contribution", Version 1.0, Wi-Fi Alliance® Technical Task Group, Jun. 26, 2013, total 60 pages.

*Primary Examiner* — Farah Faroul
(74) *Attorney, Agent, or Firm* — Huawei Device Co., Ltd.

(57) ABSTRACT

In a process for a wireless network device in a first Neighbor Awareness Network device cluster (NAN cluster) to join a second NAN cluster, the wireless network device first discovers the second NAN cluster by means of scanning for networking signals from the second NAN cluster. If it determines, based on the attribute information of the second NAN cluster, to join the second NAN cluster, the wireless network device sends an event message to other wireless network devices in the first NAN cluster. The event message also contains a cluster ID (CID) of the second NAN cluster. The wireless network device joins the second NAN cluster, wherein the step of joining comprises: performing service discovery in the second NAN cluster instead of performing service discovery in the first NAN cluster.

12 Claims, 11 Drawing Sheets

(51) Int. Cl.
*H04W 48/16* (2009.01)
*H04W 84/18* (2009.01)

(56) References Cited

U.S. PATENT DOCUMENTS

| | | |
|---|---|---|
| 2007/0036105 A1 | 2/2007 | Chun et al. |
| 2009/0028082 A1 | 1/2009 | Wynn et al. |
| 2009/0135758 A1 | 5/2009 | Alper et al. |
| 2009/0290511 A1 | 11/2009 | Budampati et al. |
| 2010/0042869 A1* | 2/2010 | Szabo ................. G06F 8/67 714/4.1 |
| 2010/0073686 A1* | 3/2010 | Medeiros ............ G01S 3/7864 356/615 |
| 2011/0149799 A1 | 6/2011 | Wu et al. |
| 2012/0020325 A1 | 1/2012 | Swamy et al. |
| 2013/0128786 A1* | 5/2013 | Sultan ............... H04W 52/0238 370/311 |
| 2013/0138792 A1 | 5/2013 | Preden et al. |
| 2014/0112189 A1* | 4/2014 | Abraham ............. H04W 4/206 370/254 |
| 2015/0023341 A1 | 1/2015 | Zhao et al. |
| 2015/0341799 A1* | 11/2015 | Zhang ................. H04W 16/24 370/280 |

FOREIGN PATENT DOCUMENTS

| | | |
|---|---|---|
| CN | 103118406 A | 5/2013 |
| WO | 2011154911 A1 | 12/2011 |
| WO | 2013045486 A1 | 4/2013 |

\* cited by examiner

METHOD, DEVICE, AND SYSTEM FOR JOINING NEIGHBOR AWARENESS NETWORK CLUSTER

CROSS-REFERENCE TO RELATED APPLICATION

This application is a continuation of International Application No. PCT/CN2014/074887, filed on Apr. 8, 2014, which claims priority to Chinese Patent Application No. 201310351937.9, filed with the Chinese Patent Office on Aug. 13, 2013, both of which are hereby incorporated by reference in their entireties.

TECHNICAL FIELD

The present invention relates to the field of wireless technologies, and in particular, to a method, device, and system for joining a neighbor awareness network device cluster (Neighbor Awareness Network Cluster).

BACKGROUND

A Wi-Fi (Wireless Fidelity) technology is a short-distance wireless communications technology, and is already widely used due to its advantages such as a free spectrum and a high transmission rate. For example, in a scenario in which an AP (Access Point, access point) is disposed at an airport, or in a restaurant or a conference room, a Wi-Fi device accesses a network by using the AP. For another example, in a scenario in which no AP is disposed, Wi-Fi devices directly communicate with each other to implement data sharing between the Wi-Fi devices and use of various services, that is, communication is implemented between the Wi-Fi devices.

For the scenario in which no AP is disposed, the Wi-Fi Alliance (Wi-Fi Alliance) puts forward a NAN (Neighbor Awareness Network, neighbor awareness network) technology to implement synchronization and service discovery between the Wi-Fi devices and then achieve an objective of implementing communication between the Wi-Fi devices.

FIG. 1 is a schematic diagram of a DW (Discovery Window) of a neighbor awareness network device cluster on a sixth channel of 2.4 GHz frequency band. As can be seen from FIG. 1, in a same neighbor awareness network device cluster, time duration of a DW is fixed, and a time interval between any two neighboring DWs is fixed. In a DW, both a Master (master device) and a Non-Master Sync (non-master synchronization device) that are in the neighbor awareness network device cluster may contend for sending a Sync Beacon (synchronization beacon frame) to implement device synchronization in a network; however, at other time beyond the DW, the Master sends a Discovery Beacon (discovery beacon frame) to announce existence of the neighbor awareness network device cluster.

As can be known from the description of the neighbor awareness network technology, multiple Wi-Fi devices may join a neighbor awareness network device cluster, and implement synchronization between the Wi-Fi devices and service search and discovery in a DW of the neighbor awareness network device cluster. Because the time duration of a DW is shorter than the time interval between two neighboring DWs, and a Wi-Fi device needs to, only within the very short time duration of the DW, listen on a working channel and perform service discovery, the Wi-Fi device may perform service search and discovery continuously in a low power consumption mode.

When a Wi-Fi device scans a working channel of a neighbor awareness network and discovers multiple neighbor awareness network device clusters, the Wi-Fi device may join each neighbor awareness network device cluster, and implement synchronization and service search and discovery in each neighbor awareness network device cluster. That is, the Wi-Fi device needs to perform channel listening in a DW of each neighbor awareness network device cluster, participate in an election of a synchronization device, and be synchronized to the discovery window of the neighbor awareness network device cluster to perform service discovery, thereby implementing service search and discovery.

Assuming that the Wi-Fi device joins two neighbor awareness network device clusters (which may be separately called neighbor awareness network device cluster-A and neighbor awareness network device cluster-B), FIG. 2 shows a schematic diagram of composition of a neighbor awareness network in which the Wi-Fi device joins the neighbor awareness network device cluster-A and the neighbor awareness network device cluster-B, and FIG. 3 shows a schematic diagram of the neighbor awareness network device cluster-A and the neighbor awareness network device cluster-B that have a same working channel but unaligned DWs. The Wi-Fi device not only needs to, in an DW of the neighbor awareness network device cluster-A, listen on a channel, participate in an election of a synchronization device, and be synchronized to the discovery window of the neighbor awareness network device cluster to perform service discovery, but also needs to, in an DW of the neighbor awareness network device cluster-B, listen on a channel, participate in an election of a synchronization device, and be synchronized to the discovery window of the neighbor awareness network device cluster to perform service discovery. In a case in which service discovery needs to be performed continuously (possibly because no desired service is discovered for a long time or it is necessary to participate all the time in implementing service provisioning to the outside), the actual working time spent by the Wi-Fi device in joining multiple neighbor awareness network device clusters to perform service search and discovery is apparently longer compared with when the Wi-Fi device needs to join only one neighbor awareness network device cluster, and therefore, a relative power consumption of the Wi-Fi device is relatively high. In addition, on the working channel of the neighbor awareness network, DW resources of both the neighbor awareness network device cluster-A and the neighbor awareness network device cluster-B are occupied, and remaining available resources on the working channel are reduced, resulting in a problem of a relatively high resource usage of the working channel.

In conclusion, when the Wi-Fi device detects multiple neighbor awareness network device clusters and separately joins each neighbor awareness network, actual working time spent by the Wi-Fi device in service search and discovery is prolonged, power consumption of the Wi-Fi device is increased, and available resources on the working channel are reduced. Therefore, currently it is urgent to find a solution that can maintain a low power consumption of the Wi-Fi device without excessively occupying available resources of the working channel of the neighbor awareness network in a case in which the Wi-Fi device detects multiple neighbor awareness network device clusters.

SUMMARY

Embodiments of the present invention provide a method, device, and system for joining a neighbor awareness network device cluster, which are used to solve problems of a high power consumption of a device and reduction of available resources on a working channel in the prior art.

In a first aspect, a method for joining a neighbor awareness network device cluster is provided. The method includes:

when discovering a second neighbor awareness network device cluster, acquiring, by a wireless device in a first neighbor awareness network device cluster, attribute information of the second neighbor awareness network device cluster;

comparing, by the wireless device, the attribute information of the second neighbor awareness network device cluster with attribute information of the first neighbor awareness network device cluster to determine whether it is necessary to join the second neighbor awareness network device cluster; and when determining that it is necessary to join the second neighbor awareness network device cluster, sending, by the wireless device, an event message in the first neighbor awareness network device cluster, leaving the first neighbor awareness network device cluster, and joining the second neighbor awareness network device cluster, where the event message is about joining the second neighbor awareness network device cluster and includes the attribute information of the second neighbor awareness network device cluster, so that other wireless devices in the first neighbor awareness network device cluster that receive the event message are capable of joining the second neighbor awareness network device cluster according to the attribute information of the second neighbor awareness network device cluster.

According to the first aspect, in a first possible implementation manner of the first aspect, the discovering, by a wireless device, a second neighbor awareness network device cluster and acquiring attribute information of the second neighbor awareness network device cluster specifically include:

when a cluster identifier included in a received beacon frame or service frame of a neighbor awareness network is different from a locally recorded cluster identifier of the first neighbor awareness network device cluster, determining, by the wireless device, that the second neighbor awareness network device cluster is discovered; and acquiring, by the wireless device, the attribute information of the second neighbor awareness network device cluster from the received beacon frame or service frame of the neighbor awareness network.

According to the first aspect or the first possible implementation manner of the first aspect, in a second possible implementation manner of the first aspect, the attribute information of the second neighbor awareness network device cluster includes at least one type of the following information:

a cluster identifier of the second neighbor awareness network device cluster, the number of wireless devices included in the second neighbor awareness network device cluster, an anchor master rank in the second neighbor awareness network device cluster, a hop count from the wireless device to an anchor master device in the second neighbor awareness network device cluster, and transmission time of a beacon frame of the anchor master device in the second neighbor awareness network device cluster.

According to the first aspect, or the first possible implementation manner or second possible implementation manner of the first aspect, in a third possible implementation manner of the first aspect, the determining, by the wireless device, whether it is necessary to join the second neighbor awareness network device cluster specifically includes:

comparing, by the wireless device, the cluster identifier of the second neighbor awareness network device cluster with the locally recorded cluster identifier of the first neighbor awareness network device cluster, and determining, according to a preset determination rule, whether it is necessary to join the second neighbor awareness network device cluster.

According to the first aspect, or the first possible implementation manner, second possible implementation manner, or third possible implementation manner of the first aspect, in a fourth possible implementation manner of the first aspect, the joining, by other wireless devices in the first neighbor awareness network device cluster that receive the event message, the second neighbor awareness network device cluster specifically includes:

comparing, by the other wireless devices in the first neighbor awareness network device cluster that receive the event message, the cluster identifier of the second neighbor awareness network device cluster that is included in the event message with the locally recorded cluster identifier of the first neighbor awareness network device cluster, and when determining, according to the preset determination rule, that it is necessary to join the second neighbor awareness network device cluster, leaving the first neighbor awareness network device cluster, and joining the second neighbor awareness network device cluster.

According to the third possible implementation manner or fourth possible implementation manner of the first aspect, in a fifth possible implementation manner of the first aspect, the determination rule is specifically: when the cluster identifier of the second neighbor awareness network device cluster is greater than the cluster identifier of the first neighbor awareness network device cluster, it is necessary to join the second neighbor awareness network device cluster; or the determination rule is specifically: when the cluster identifier of the second neighbor awareness network device cluster is less than the cluster identifier of the first neighbor awareness network device cluster, it is necessary to join the second neighbor awareness network device cluster.

According to the first aspect, or the first possible implementation manner, second possible implementation manner, third possible implementation manner, fourth possible implementation manner, or fifth possible implementation manner of the first aspect, in a sixth possible implementation manner of the first aspect, the leaving, by the wireless device, the first neighbor awareness network device cluster specifically includes:

not participating, by the wireless device, in contending for serving as a synchronization device in the first neighbor awareness network device cluster any longer; and the joining, by the wireless device, the second neighbor awareness network device cluster specifically includes:

participating, by the wireless device, in contending for serving as a synchronization device in the second neighbor awareness network device cluster, and being synchronized to a discovery window of the second neighbor awareness network device cluster to perform service discovery.

According to the first aspect, or the first possible implementation manner, second possible implementation manner, third possible implementation manner, fourth possible implementation manner, fifth possible implementation manner, or sixth possible implementation manner of the first aspect, in a seventh possible implementation manner of the first aspect, the event message is a beacon frame or a service frame of a neighbor awareness network, where the beacon frame or the service frame includes the attribute information of the second neighbor awareness network device cluster; or
the event message is a beacon frame or a service frame of a neighbor awareness network, where the beacon frame or the service frame includes merging indication information, and the merging indication information is used to instruct wireless devices in the first neighbor awareness network device cluster that receive the event message to join the second neighbor awareness network device cluster specified by the merging indication information.

According to the seventh possible implementation manner of the first aspect, in an eighth possible implementation manner of the first aspect, the including, by the wireless device, the attribute information of the second neighbor awareness network device cluster in the beacon frame or the service frame of the neighbor awareness network specifically includes:
carrying, by the wireless device, the cluster identifier of the second neighbor awareness network device cluster in a destination address field of the beacon frame of the neighbor awareness network, and carrying the attribute information of the second neighbor awareness network device cluster in an attribute information field of the neighbor awareness network; or
carrying, by the wireless device, the cluster identifier of the second neighbor awareness network device cluster in a destination address field of the service frame of the neighbor awareness network, and carrying the attribute information of the second neighbor awareness network device cluster in a frame body.

According to the first aspect, or the first possible implementation manner, second possible implementation manner, third possible implementation manner, fourth possible implementation manner, fifth possible implementation manner, sixth possible implementation manner, seventh possible implementation manner, or eighth possible implementation manner of the first aspect, in a ninth possible implementation manner of the first aspect, the method further includes:
determining, by the other wireless devices in the first neighbor awareness network device cluster that receive the event message, according to received signal strength of the event message and the number of received event messages, whether to send, in the first neighbor awareness network device cluster, an event message about joining the second neighbor awareness network device cluster, where the event message includes the attribute information of the second neighbor awareness network device cluster.

According to the ninth possible implementation manner of the first aspect, in a tenth possible implementation manner of the first aspect, the other wireless devices in the first neighbor awareness network device cluster that receive the event message use the following manner to determine whether to send, in the first neighbor awareness network device cluster, the event message about joining the second neighbor awareness network device cluster:
determining, by the other wireless devices in the first neighbor awareness network device cluster that receive the event message, whether the received signal strength of the event message is higher than a first threshold; and
if the received signal strength of the event message is higher than the first threshold, in the first neighbor awareness network device cluster, not sending the event message about joining the second neighbor awareness network device cluster; or if the received signal strength of the event message is lower than or equal to the first threshold, determining the number of received event messages whose received signal strength is higher than a second threshold, and if the number reaches the threshold, in the first neighbor awareness network device cluster, not sending the event message about joining the second neighbor awareness network device cluster, or if the number does not reach the threshold, in the first neighbor awareness network device cluster, sending the event message about joining the second neighbor awareness network device cluster; where
the first threshold is higher than the second threshold.

In a second aspect, a method for joining a neighbor awareness network device cluster is provided and includes:
when discovering a second neighbor awareness network device cluster, acquiring, by a wireless device in a first neighbor awareness network device cluster, attribute information of the second neighbor awareness network device cluster;
comparing, by the wireless device, the attribute information of the second neighbor awareness network device cluster with attribute information of the first neighbor awareness network device cluster to determine whether it is necessary to join the second neighbor awareness network device cluster; and
when determining that it is necessary to join the second neighbor awareness network device cluster, leaving, by the wireless device, the first neighbor awareness network device cluster, and joining the second neighbor awareness network device cluster.

According to the second aspect, in a first possible implementation manner of the second aspect, the discovering, by a wireless device, a second neighbor awareness network device cluster and acquiring attribute information of the second neighbor awareness network device cluster specifically include:
when a cluster identifier included in a received beacon frame or service frame of a neighbor awareness network is different from a locally recorded cluster identifier of the first neighbor awareness network device cluster, determining, by the wireless device, that the second neighbor awareness network device cluster is discovered; and
acquiring, by the wireless device, the attribute information of the second neighbor awareness network device cluster from the received beacon frame or service frame of the neighbor awareness network.

According to the second aspect or the first possible implementation manner of the second aspect, in a second possible implementation manner of the second aspect, the attribute information of the second neighbor awareness network device cluster includes at least one type of the following information:
a cluster identifier of the second neighbor awareness network device cluster, the number of wireless devices included in the second neighbor awareness network device cluster, an anchor master rank in the second neighbor awareness network device cluster, a hop count from the wireless device to an anchor master device in the second neighbor awareness network device cluster, and transmission time of a beacon frame of the anchor master device in the second neighbor awareness network device cluster.

According to the second possible implementation manner of the second aspect, in a third possible implementation manner of the second aspect, the determining, by the wireless device, whether it is necessary to join the second neighbor awareness network device cluster specifically includes:

comparing, by the wireless device, the cluster identifier of the second neighbor awareness network device cluster with the locally recorded cluster identifier of the first neighbor awareness network device cluster, and determining, according to a preset determination rule, whether it is necessary to join the second neighbor awareness network device cluster.

According to the third possible implementation manner of the second aspect, in a fourth possible implementation manner of the second aspect, the determination rule is specifically: when the cluster identifier of the second neighbor awareness network device cluster is greater than the cluster identifier of the first neighbor awareness network device cluster, it is necessary to join the second neighbor awareness network device cluster; or the determination rule is specifically: when the cluster identifier of the second neighbor awareness network device cluster is less than the cluster identifier of the first neighbor awareness network device cluster, it is necessary to join the second neighbor awareness network device cluster.

According to the second aspect, or the first possible implementation manner, second possible implementation manner, third possible implementation manner, or fourth possible implementation manner of the second aspect, in a fifth possible implementation manner of the second aspect, the leaving, by the wireless device, the first neighbor awareness network device cluster specifically includes:

not participating, by the wireless device, in contending for serving as a synchronization device in the first neighbor awareness network device cluster any longer; and the joining, by the wireless device, the second neighbor awareness network device cluster specifically includes:

participating, by the wireless device, in contending for serving as a synchronization device in the second neighbor awareness network device cluster, and being synchronized to a discovery window of the second neighbor awareness network device cluster to perform service discovery.

In a third aspect, a method for joining a neighbor awareness network device cluster is provided and includes:

when discovering multiple neighbor awareness network device clusters, creating, by a wireless device, a new neighbor awareness network device cluster; and sending, separately in the multiple neighbor awareness network device clusters by the wireless device, an event message about joining the new neighbor awareness network device cluster, so that other wireless devices that are in the multiple neighbor awareness network device clusters and receive the event message join the new neighbor awareness network device cluster according to the event message, where the event message includes attribute information of the new neighbor awareness network device cluster.

According to the third aspect, in a first possible implementation manner of the third aspect, a cluster identifier of the new neighbor awareness network device cluster created by the wireless device and cluster identifiers of the multiple neighbor awareness network device clusters meet a preset condition.

According to the first possible implementation manner of the third aspect, in a second possible implementation manner of the third aspect, the preset condition is specifically:

the cluster identifier of the new neighbor awareness network device cluster created by the wireless device is greater than a cluster identifier of any one of the multiple neighbor awareness network device clusters; or the preset condition is specifically: the cluster identifier of the new neighbor awareness network device cluster created by the wireless device is less than a cluster identifier of any one of the multiple neighbor awareness network device clusters.

According to the third aspect, or the first possible implementation manner, second possible implementation manner, or third possible implementation manner of the third aspect, in a fourth possible implementation manner of the third aspect, transmission time of a beacon frame of an anchor master device in the new neighbor awareness network device cluster created by the wireless device is the same as transmission time of a beacon frame of an anchor master device in one of the multiple neighbor awareness network device clusters.

In a fourth aspect, a wireless device for joining a neighbor awareness network device cluster is provided, where the wireless device in a first neighbor awareness network device cluster includes:

a discovery module, configured to discover a neighbor awareness network device cluster;

an attribute information acquiring module, configured to acquire attribute information of the second neighbor awareness network device cluster when the discovery module discovers a second neighbor awareness network device cluster;

a determining module, configured to compare the attribute information of the second neighbor awareness network device cluster with attribute information of the first neighbor awareness network device cluster to determine whether it is necessary to join the second neighbor awareness network device cluster;

a message sending module, configured to send an event message in the first neighbor awareness network device cluster when the determining module determines that it is necessary to join the second neighbor awareness network device cluster, where the event message is about joining the second neighbor awareness network device cluster and includes the attribute information of the second neighbor awareness network device cluster, so that other wireless devices in the first neighbor awareness network device cluster that receive the event message are capable of joining the second neighbor awareness network device cluster according to the attribute information of the second neighbor awareness network device cluster;

a leaving module, configured to leave the first neighbor awareness network device cluster when the determining module determines that it is necessary to join the second neighbor awareness network device cluster; and a joining module, configured to join the second neighbor awareness network device cluster when the determining module determines that it is necessary to join the second neighbor awareness network device cluster.

According to the fourth aspect, in a first possible implementation manner of the fourth aspect, the discovery module is specifically configured to determine, when a cluster identifier included in a received beacon frame or service frame of a neighbor awareness network is different from a locally recorded cluster identifier of the first neighbor awareness network device cluster, that the second neighbor awareness network device cluster is discovered; and the attribute information acquiring module is specifically configured to acquire the attribute information of the second neighbor awareness network device cluster from the received beacon frame or service frame of the neighbor awareness network.

According to the fourth aspect or the first possible implementation manner of the fourth aspect, in a second possible implementation manner of the fourth aspect, the attribute information of the second neighbor awareness network device cluster includes at least one type of the following information:

a cluster identifier of the second neighbor awareness network device cluster, the number of wireless devices included in the second neighbor awareness network device cluster, an anchor master rank in the second neighbor awareness network device cluster, a hop count from the wireless device to an anchor master device in the second neighbor awareness network device cluster, and transmission time of a beacon frame of the anchor master device in the second neighbor awareness network device cluster.

According to the fourth aspect, or the first possible implementation manner or second possible implementation manner of the fourth aspect, in a third possible implementation manner of the fourth aspect, the determining module is specifically configured to compare the cluster identifier of the second neighbor awareness network device cluster with the locally recorded cluster identifier of the first neighbor awareness network device cluster, and determine, according to a preset determination rule, whether it is necessary to join the second neighbor awareness network device cluster.

According to the third possible implementation manner of the fourth aspect, in a fourth possible implementation manner of the fourth aspect, the determination rule is specifically: when the cluster identifier of the second neighbor awareness network device cluster is greater than the cluster identifier of the first neighbor awareness network device cluster, it is necessary to join the second neighbor awareness network device cluster; or the determination rule is specifically: when the cluster identifier of the second neighbor awareness network device cluster is less than the cluster identifier of the first neighbor awareness network device cluster, it is necessary to join the second neighbor awareness network device cluster.

According to the fourth aspect, or the first possible implementation manner, second possible implementation manner, or third possible implementation manner of the fourth aspect, in a fourth possible implementation manner of the fourth aspect, the leaving module is specifically configured not to participate in contending for serving as a synchronization device in the first neighbor awareness network device cluster any longer; and the joining module is specifically configured to participate in contending for serving as a synchronization device in the second neighbor awareness network device cluster, and be synchronized to a discovery window of the second neighbor awareness network device cluster to perform service discovery.

According to the fourth aspect, or the first possible implementation manner, second possible implementation manner, third possible implementation manner, or fourth possible implementation manner of the fourth aspect, in a fifth possible implementation manner of the fourth aspect, the event message is a beacon frame or a service frame of a neighbor awareness network, where the beacon frame or the service frame includes the attribute information of the second neighbor awareness network device cluster; or the event message is a beacon frame or a service frame of a neighbor awareness network, where the beacon frame or the service frame includes merging indication information, and the merging indication information is used to instruct wireless devices in the first neighbor awareness network device cluster that receive the event message to join the second neighbor awareness network device cluster specified by the merging indication information.

According to the fifth possible implementation manner of the fourth aspect, in a sixth possible implementation manner of the fourth aspect, the message sending module is specifically configured to: when the determining module determines that it is necessary to join the second neighbor awareness network device cluster, carry the cluster identifier of the second neighbor awareness network device cluster in a destination address field of the beacon frame of the neighbor awareness network, carry the attribute information of the second neighbor awareness network device cluster in an attribute information field of the neighbor awareness network, and send the beacon frame as an event message in the first neighbor awareness network device cluster; or carry the cluster identifier of the second neighbor awareness network device cluster in a destination address field of the service frame of the neighbor awareness network, carry the attribute information of the second neighbor awareness network device cluster in a frame body, and send the service frame as an event message in the first neighbor awareness network device cluster.

In a fifth aspect, a wireless device for joining a neighbor awareness network device cluster is provided, where the wireless device in a first neighbor awareness network device cluster includes:

a wireless interface, configured to scan a neighbor awareness network device cluster; and a processor, configured to discover a second neighbor awareness network device cluster according to a scanning result of the wireless interface, and acquire attribute information of the second neighbor awareness network device cluster; compare the attribute information of the second neighbor awareness network device cluster with attribute information of the first neighbor awareness network device cluster to determine whether it is necessary to join the second neighbor awareness network device cluster; and when a determination result is that it is necessary to join the second neighbor awareness network device cluster, control the wireless interface to send, in the first neighbor awareness network device cluster, an event message about joining the second neighbor awareness network device cluster, leave the first neighbor awareness network device cluster, and join the second neighbor awareness network device cluster, where the event message includes the attribute information of the second neighbor awareness network device cluster, so that other wireless devices in the first neighbor awareness network device cluster that receive the event message are capable of joining the second neighbor awareness network device cluster according to the attribute information of the second neighbor awareness network device cluster.

According to the fifth aspect, in a first possible implementation manner of the fifth aspect, the wireless interface is specifically configured to scan a beacon frame or a service frame of a neighbor awareness network; and the discovering a second neighbor awareness network device cluster according to a scanning result of the wireless interface, and acquiring attribute information of the second neighbor awareness network device cluster are specifically: when a CID included in a received beacon frame or service frame of a neighbor awareness network is different from a locally recorded CID of the first neighbor awareness network device cluster, determining that the second neighbor awareness network device cluster is discovered; and acquiring the attribute information of the second neighbor awareness network device cluster from the received beacon frame or service frame of the neighbor awareness network.

According to the fifth aspect or the first possible implementation manner of the fifth aspect, in a second possible implementation manner of the fifth aspect, the attribute information of the second neighbor awareness network device cluster includes at least one type of the following information:

a CID of the second neighbor awareness network device cluster, the number of wireless devices included in the second neighbor awareness network device cluster, an anchor master rank in the second neighbor awareness network device cluster, a hop count from the wireless device to an anchor master device in the second neighbor awareness network device cluster, and transmission time of a beacon frame of the anchor master device in the second neighbor awareness network device cluster.

According to the second possible implementation manner of the fifth aspect, in a third possible implementation manner of the fifth aspect, the comparing the attribute information of the second neighbor awareness network device cluster with attribute information of the first neighbor awareness network device cluster to determine whether it is necessary to join the second neighbor awareness network device cluster are specifically: comparing the CID of the second neighbor awareness network device cluster with the locally recorded CID of the first neighbor awareness network device cluster, and determining, according to a preset determination rule, whether it is necessary to join the second neighbor awareness network device cluster.

According to the third possible implementation manner of the fifth aspect, in a fourth possible implementation manner of the fifth aspect, the determination rule is specifically: when the CID of the second neighbor awareness network device cluster is greater than the CID of the first neighbor awareness network device cluster, it is necessary to join the second neighbor awareness network device cluster; or the determination rule is specifically: when the CID of the second neighbor awareness network device cluster is less than the CID of the first neighbor awareness network device cluster, it is necessary to join the second neighbor awareness network device cluster.

According to the fifth aspect, or the first possible implementation manner, second possible implementation manner, third possible implementation manner, or fourth possible implementation manner of the fifth aspect, in a fifth possible implementation manner of the fifth aspect, the leaving the first neighbor awareness network device cluster is specifically: not participating in contending for serving as a synchronization device in the first neighbor awareness network device cluster any longer; and the joining the second neighbor awareness network device cluster is specifically: participating in contending for serving as a synchronization device in the second neighbor awareness network device cluster, and being synchronized to a discovery window of the second neighbor awareness network device cluster to perform service discovery.

According to the fifth aspect, or the first possible implementation manner, second possible implementation manner, third possible implementation manner, fourth possible implementation manner, or fifth possible implementation manner of the fifth aspect, in a sixth possible implementation manner of the fifth aspect, the event message is a beacon frame or a service frame of a neighbor awareness network, where the beacon frame or the service frame includes the attribute information of the second neighbor awareness network device cluster; or the event message is a beacon frame or a service frame of a neighbor awareness network, where the beacon frame or the service frame includes merging indication information, and the merging indication information is used to instruct wireless devices in the first neighbor awareness network device cluster that receive the event message to join the second neighbor awareness network device cluster specified by the merging indication information.

According to the sixth possible implementation manner of the fifth aspect, in a seventh possible implementation manner of the fifth aspect, the sending, in the first neighbor awareness network device cluster, an event message about joining the second neighbor awareness network device cluster, is specifically: carrying the CID of the second neighbor awareness network device cluster in a destination address field of the beacon frame of the neighbor awareness network, carrying the attribute information of the second neighbor awareness network device cluster in an attribute information field of the neighbor awareness network, and controlling the wireless interface to send the frame as an event message in the first neighbor awareness network device cluster; or carrying the CID of the second neighbor awareness network device cluster in a destination address field of the service frame of the neighbor awareness network, carrying the attribute information of the second neighbor awareness network device cluster in a frame body, and controlling the wireless interface to send the frame as an event message in the first neighbor awareness network device cluster.

In a sixth aspect, a wireless device for joining a neighbor awareness network device cluster is provided, where the wireless device in a first neighbor awareness network device cluster includes:

a receiving module, configured to receive an event message about joining a second neighbor awareness network device cluster, where the event message is sent by other wireless devices and includes attribute information of the second neighbor awareness network device cluster; and a joining module, configured to join the second neighbor awareness network device cluster according to the attribute information of the second neighbor awareness network device cluster.

According to the sixth aspect, in a first possible implementation manner of the sixth aspect, the wireless device further includes:

a determining module, configured to compare a cluster identifier of the second neighbor awareness network device cluster that is included in the event message with a locally recorded cluster identifier of the first neighbor awareness network device cluster, and determine, according to a preset determination rule, whether it is necessary to join the second neighbor awareness network device cluster; and a leaving module, configured to leave the first neighbor awareness network device cluster when the determining module determines that it is necessary to join the second neighbor awareness network device cluster; where the joining module is specifically configured to join the second neighbor awareness network device cluster when the determining module determines that it is necessary to join the second neighbor awareness network device cluster.

According to the first possible implementation manner of the sixth aspect, in a second possible implementation manner of the sixth aspect, the determination rule is specifically: when the cluster identifier of the second neighbor awareness network device cluster is greater than the cluster identifier of the first neighbor awareness network device cluster, it is necessary to join the second neighbor awareness network device cluster; or the determination rule is specifically: when the cluster identifier of the second neighbor awareness network device cluster is less than the cluster identifier of the first neighbor awareness network device cluster, it is necessary to join the second neighbor awareness network device cluster.

According to the sixth aspect, or the first implementation manner or second implementation manner of the sixth aspect, in a third possible implementation manner of the sixth aspect, the wireless device further includes:

a message sending module, configured to determine, according to received signal strength of the event message and the number of received event messages, in the first neighbor awareness network device cluster, whether to send an event message about joining the second neighbor awareness network device cluster, and when determining sending the event message, in the first neighbor awareness network device cluster, send the event message about joining the second neighbor awareness network device cluster.

According to the third implementation manner of the sixth aspect, in a fourth possible implementation manner of the sixth aspect, the message sending module is specifically configured to: determine whether the received signal strength of the event message is higher than a first threshold, and if the received signal strength of the event message is higher than the first threshold, in the first neighbor awareness network device cluster, not send the event message about joining the second neighbor awareness network device cluster; or if the received signal strength of the event message is lower than or equal to the first threshold, determine the number of received event messages whose received signal strength is higher than a second threshold, and if the number reaches the threshold, in the first neighbor awareness network device cluster, not send the event message about joining the second neighbor awareness network device cluster, or if the number does not reach the threshold, in the first neighbor awareness network device cluster, send the event message about joining the second neighbor awareness network device cluster; where the first threshold is higher than the second threshold.

In a seventh aspect, a wireless device for joining a neighbor awareness network device cluster is provided, where the wireless device in a first neighbor awareness network device cluster includes:

a wireless interface, configured to receive an event message about joining a second neighbor awareness network device cluster, where the event message is sent by other wireless devices and includes attribute information of the second neighbor awareness network device cluster; and a processor, configured to join the second neighbor awareness network device cluster according to the attribute information of the second neighbor awareness network device cluster.

According to the seventh aspect, in a first possible implementation manner of the seventh aspect, the processor is specifically configured to compare a CID of the second neighbor awareness network device cluster that is included in the event message with a locally recorded CID of the first neighbor awareness network device cluster, and determine, according to a preset determination rule, whether it is necessary to join the second neighbor awareness network device cluster; and when a determination result is that it is necessary to join the second neighbor awareness network device cluster, leave the first neighbor awareness network device cluster, and join the second neighbor awareness network device cluster.

According to the first possible implementation manner of the seventh aspect, in a second possible implementation manner of the seventh aspect, the determination rule is specifically: when the CID of the second neighbor awareness network device cluster is greater than the CID of the first neighbor awareness network device cluster, it is necessary to join the second neighbor awareness network device cluster; or the determination rule is specifically: when the CID of the second neighbor awareness network device cluster is less than the CID of the first neighbor awareness network device cluster, it is necessary to join the second neighbor awareness network device cluster.

According to the seventh aspect, or the first possible implementation manner or second possible implementation manner of the seventh aspect, in a third possible implementation manner of the seventh aspect, the processor is further configured to determine, according to received signal strength of the event message and the number of received event messages, whether to send, in the first neighbor awareness network device cluster, an event message about joining the second neighbor awareness network device cluster.

According to the third possible implementation manner of the seventh aspect, in a fourth possible implementation manner of the seventh aspect, the determining, according to received signal strength of the event message and the number of received event messages, whether to send, in the first neighbor awareness network device cluster, an event message about joining the second neighbor awareness network device cluster is specifically: determining whether the received signal strength of the event message is higher than a first threshold; and if the received signal strength of the event message is higher than the first threshold, in the first neighbor awareness network device cluster, not sending the event message about joining the second neighbor awareness network device cluster; or if the received signal strength of the event message is lower than or equal to the first threshold, determining the number of received event messages whose received signal strength is higher than a second threshold, and if the number reaches the threshold, in the first neighbor awareness network device cluster, not sending the event message about joining the second awareness network device cluster, or if the number does not reach the threshold, in the first neighbor awareness network device cluster, sending the event message about joining the second neighbor awareness network device cluster; where the first threshold is higher than the second threshold.

In an eighth aspect, a wireless device for joining a neighbor awareness network device cluster is provided, where the wireless device in a first neighbor awareness network device cluster includes:
 a discovery module, configured to discover a neighbor awareness network device cluster;
 an attribute information acquiring module, configured to acquire attribute information of the second neighbor awareness network device cluster when the discovery module discovers a second neighbor awareness network device cluster;
 a determining module, configured to compare the attribute information of the second neighbor awareness network device cluster with attribute information of the first neighbor awareness network device cluster to determine whether it is necessary to join the second neighbor awareness network device cluster;
 a leaving module, configured to leave the first neighbor awareness network device cluster when the determining module determines that it is necessary to join the second neighbor awareness network device cluster; and
 a joining module, configured to join the second neighbor awareness network device cluster when the determining module determines that it is necessary to join the second neighbor awareness network device cluster.

According to the eighth aspect, in a first possible implementation manner of the eighth aspect,
 the discovery module is specifically configured to determine, when a cluster identifier included in a received beacon frame or service frame of a neighbor awareness network is different from a locally recorded cluster identifier of the first neighbor awareness network device cluster, that the second neighbor awareness network device cluster is discovered; and
 the attribute information acquiring module is specifically configured to acquire the attribute information of the second neighbor awareness network device cluster from the received beacon frame or service frame of the neighbor awareness network.

According to the eighth aspect or the first possible implementation manner of the eighth aspect, in a second possible implementation manner of the eighth aspect, the attribute information of the second neighbor awareness network device cluster includes at least one type of the following information:
 a cluster identifier of the second neighbor awareness network device cluster, the number of wireless devices included in the second neighbor awareness network device cluster, an anchor master rank in the second neighbor awareness network device cluster, a hop count from the wireless device to an anchor master device in the second neighbor awareness network device cluster, and transmission time of a beacon frame of the anchor master device in the second neighbor awareness network device cluster.

According to the second possible implementation manner of the eighth aspect, in a third possible implementation manner of the eighth aspect,
 the determining module is specifically configured to compare the cluster identifier of the second neighbor awareness network device cluster with the locally recorded cluster identifier of the first neighbor awareness network device cluster, and determine, according to a preset determination rule, whether it is necessary to join the second neighbor awareness network device cluster.

According to the third possible implementation manner of the eighth aspect, in a fourth possible implementation manner of the eighth aspect, the determination rule is specifically: when the cluster identifier of the second neighbor awareness network device cluster is greater than the cluster identifier of the first neighbor awareness network device cluster, it is necessary to join the second neighbor awareness network device cluster; or
 the determination rule is specifically: when the cluster identifier of the second neighbor awareness network device cluster is less than the cluster identifier of the first neighbor awareness network device cluster, it is necessary to join the second neighbor awareness network device cluster.

According to the eighth aspect, or the first possible implementation manner, second possible implementation manner, third possible implementation manner, or fourth possible implementation manner of the eighth aspect, in a fifth possible implementation manner of the eighth aspect,
 the leaving module is specifically configured not to participate in contending for serving as a synchronization device in the first neighbor awareness network device cluster any longer; and
 the joining module is specifically configured to participate in contending for serving as a synchronization device in the second neighbor awareness network device cluster, and be synchronized to a discovery window of the second neighbor awareness network device cluster to perform service discovery.

In a ninth aspect, a wireless device for joining a neighbor awareness network device cluster is provided, where the wireless device in a first neighbor awareness network device cluster includes:
 a wireless interface, configured to scan a neighbor awareness network device cluster; and
 a processor, configured to discover a second neighbor awareness network device cluster according to a scanning result of the wireless interface, and acquire attribute information of the second neighbor awareness network device cluster; compare the attribute information of the second neighbor awareness network device cluster with attribute information of the first neighbor awareness network device cluster to determine whether it is necessary to join the second neighbor awareness network device cluster; and when a determination result is that it is necessary to join the second neighbor awareness network device cluster, leave the first neighbor awareness network device cluster, and join the second neighbor awareness network device cluster.

According to the ninth aspect, in a first possible implementation manner of the ninth aspect, the wireless interface is specifically configured to scan a beacon frame or a service frame of a neighbor awareness network; and the discovering a second neighbor awareness network device cluster according to a scanning result of the wireless interface, and acquiring attribute information of the second neighbor awareness network device cluster are specifically: when a CID included in a beacon frame or a service frame of a neighbor awareness network that is scanned by the wireless interface is different from a locally recorded CID of the first neighbor awareness network device cluster, determining that the second neighbor awareness network device cluster is discovered; and acquiring the attribute information of the second neighbor awareness network device cluster from the received beacon frame or service frame of the neighbor awareness network.

According to the ninth aspect or the first possible implementation manner of the ninth aspect, in a second possible implementation manner of the ninth aspect, the attribute information of the second neighbor awareness network device cluster includes at least one type of the following information:

a CID of the second neighbor awareness network device cluster, the number of wireless devices included in the second neighbor awareness network device cluster, an anchor master rank in the second neighbor awareness network device cluster, a hop count from the wireless device to an anchor master device in the second neighbor awareness network device cluster, and transmission time of a beacon frame of the anchor master device in the second neighbor awareness network device cluster.

According to the second possible implementation manner of the ninth aspect, in a third possible implementation manner of the ninth aspect, the comparing the attribute information of the second neighbor awareness network device cluster with attribute information of the first neighbor awareness network device cluster to determine whether it is necessary to join the second neighbor awareness network device cluster are specifically: comparing the CID of the second neighbor awareness network device cluster with the locally recorded CID of the first neighbor awareness network device cluster, and determining, according to a preset determination rule, whether it is necessary to join the second neighbor awareness network device cluster.

According to the third possible implementation manner of the ninth aspect, in a fourth possible implementation manner of the ninth aspect, the determination rule is specifically: when the CID of the second neighbor awareness network device cluster is greater than the CID of the first neighbor awareness network device cluster, it is necessary to join the second neighbor awareness network device cluster; or the determination rule is specifically: when the CID of the second neighbor awareness network device cluster is less than the CID of the first neighbor awareness network device cluster, it is necessary to join the second neighbor awareness network device cluster.

According to the ninth aspect, or the first possible implementation manner, second possible implementation manner, or third possible implementation manner of the ninth aspect, in a fourth possible implementation manner of the ninth aspect, the leaving the first neighbor awareness network device cluster is specifically: not participating in contending for serving as a synchronization device in the first neighbor awareness network device cluster any longer; and the joining the second neighbor awareness network device cluster is specifically: participating in contending for serving as a synchronization device in the second neighbor awareness network device cluster, and being synchronized to a discovery window of the second neighbor awareness network device cluster to perform service discovery.

In a tenth aspect, a wireless device for joining a neighbor awareness network device cluster is provided, where the wireless device includes:

a discovery module, configured to discover a neighbor awareness network device cluster;

a creating module, configured to create a new neighbor awareness network device cluster when the discovery module discovers multiple neighbor awareness network device clusters; and a message sending module, configured to send, separately in the multiple neighbor awareness network device clusters, an event message about joining the new neighbor awareness network device cluster, where the event message includes attribute information of the new neighbor awareness network device cluster, so that other wireless devices that are in the multiple neighbor awareness network device clusters and receive the event message join the new neighbor awareness network device cluster according to the event message.

According to the tenth aspect, in a first possible implementation manner of the tenth aspect, a cluster identifier of the new neighbor awareness network device cluster and cluster identifiers of the multiple neighbor awareness network device clusters meet a preset condition.

According to the first possible implementation manner of the tenth aspect, in a second possible implementation manner of the tenth aspect, the preset condition is specifically: the cluster identifier of the new neighbor awareness network device cluster created by the wireless device is greater than a cluster identifier of any one of the multiple neighbor awareness network device clusters; or the preset condition is specifically: the cluster identifier of the new neighbor awareness network device cluster created by the wireless device is less than a cluster identifier of any one of the multiple neighbor awareness network device clusters.

According to the tenth aspect, or the first possible implementation manner or second possible implementation manner of the tenth aspect, in a third possible implementation manner of the tenth aspect, transmission time of a beacon frame of an anchor master device in the created new neighbor awareness network device cluster is the same as transmission time of a beacon frame of an anchor master device in one of the multiple neighbor awareness network device clusters.

In an eleventh aspect, a wireless device for joining a neighbor awareness network device cluster is provided and includes:

a wireless interface, configured to scan a neighbor awareness network device cluster; and a processor, configured to create a new neighbor awareness network device cluster when discovering multiple neighbor awareness network device clusters according to the scanning of the wireless interface; and send, separately in the multiple neighbor awareness network device clusters, an event message about joining the new neighbor awareness network device cluster, where the event message includes attribute information of the new neighbor awareness network device cluster, so that other wireless devices that are in the multiple neighbor awareness network device clusters and receive the event message join the new neighbor awareness network device cluster according to the event message.

In a twelfth aspect, a system for joining a neighbor awareness network device cluster is provided and includes multiple wireless devices, where:

a wireless device in a first neighbor awareness network device cluster is configured to acquire attribute information of the second neighbor awareness network device cluster when discovering a second neighbor awareness network device cluster; compare the attribute information of the second neighbor awareness network device cluster with attribute information of the first neighbor awareness network device cluster to determine whether it is necessary to join the second neighbor awareness network device cluster; and when determining that it is necessary to join the second neighbor awareness network device cluster, in the first neighbor awareness network device cluster, send an event message about joining the second neighbor awareness network device cluster, leave the first neighbor awareness network device cluster, and join the second neighbor awareness network device cluster, where the event message includes the attribute information of the second neighbor awareness network device cluster; and other wireless devices in the first neighbor awareness network device cluster that receive the event message are configured to join the second neighbor awareness network device cluster according to the attribute information of the second neighbor awareness network device cluster.

In a thirteenth aspect, a system for joining a neighbor awareness network device cluster is provided and includes:

a wireless device, configured to create a new neighbor awareness network device cluster when discovering multiple neighbor awareness network device clusters, and send, separately in the multiple neighbor awareness network device clusters, an event message about joining the new neighbor awareness network device cluster, where the event message includes attribute information of the new neighbor awareness network device cluster; and other wireless devices that are in the multiple neighbor awareness network device clusters and receive the event message, configured to join the new neighbor awareness network device cluster according to the event message.

The present invention has the following beneficial effects:

In the solutions of embodiments of the present invention, a wireless device moves between multiple neighbor awareness network device clusters according to a rule, and does not belong to the multiple neighbor awareness network device clusters at the same time; the wireless device contends for serving as a synchronization device and performs service discovery in a DW both only in a neighbor awareness network device cluster that the wireless device joins. Therefore, the actual working time spent by the wireless device in synchronization and service search and discovery is relatively short, and power consumption of the wireless device is also relatively low. Meanwhile, as time progresses, wireless devices in a neighbor awareness network device cluster may be merged into another neighbor awareness network device cluster, and a case in which DWs of some neighbor awareness network device clusters on a working channel are no longer occupied occurs. Therefore, available resources on the working channel are increased, and correct service search and discovery can be ensured.

BRIEF DESCRIPTION OF DRAWINGS

To describe the technical solutions in the embodiments of the present invention more clearly, the following briefly introduces the accompanying drawings for describing the embodiments.

DESCRIPTION OF EMBODIMENTS

Figure 1:
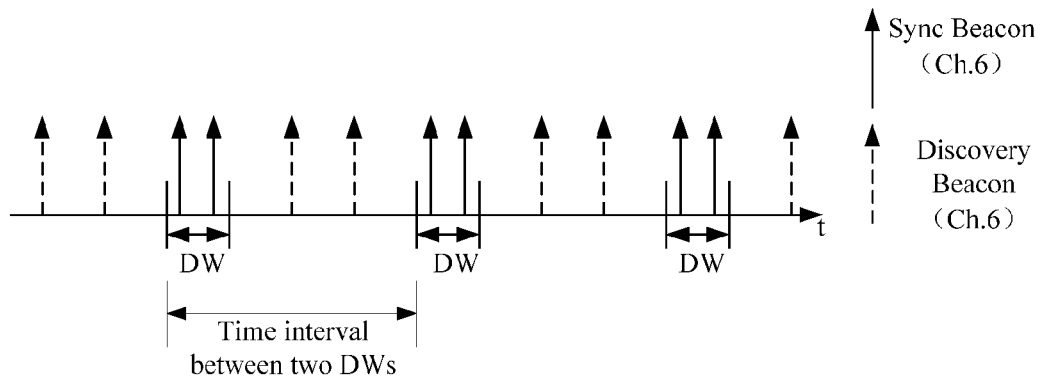
FIG. 1 is a schematic diagram of a DW of a neighbor awareness network device cluster on a sixth channel of 2.4 Ghz according to the prior art.
Figure 2:
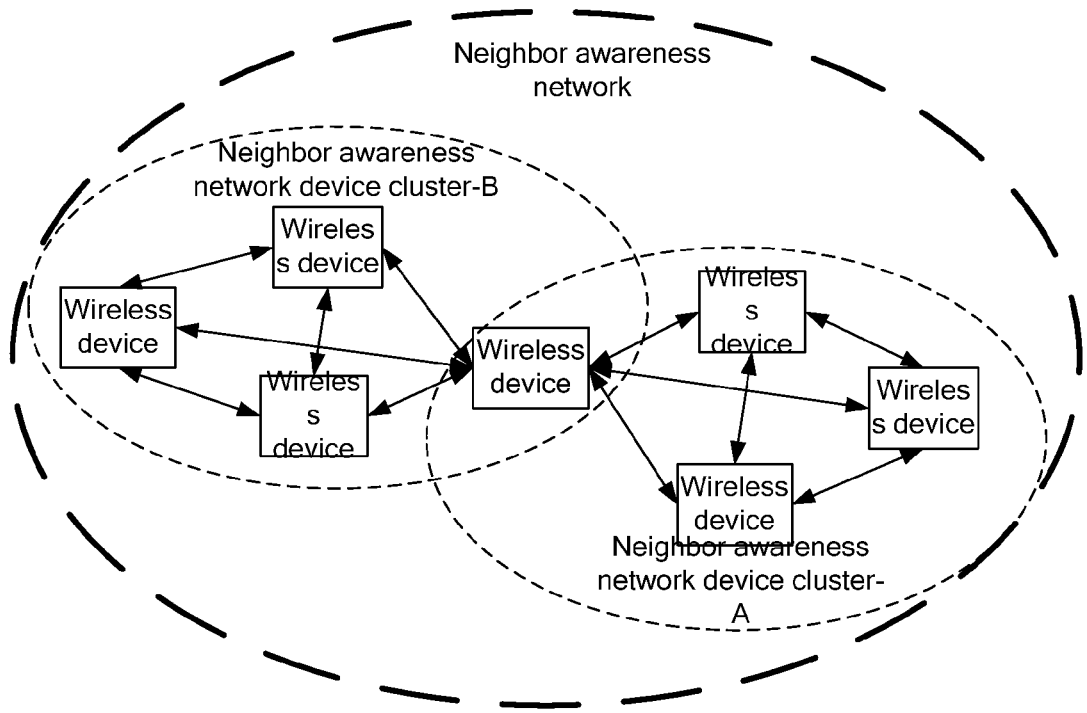
FIG. 2 is a schematic diagram of composition of a neighbor awareness network according to the prior art.
Figure 3:
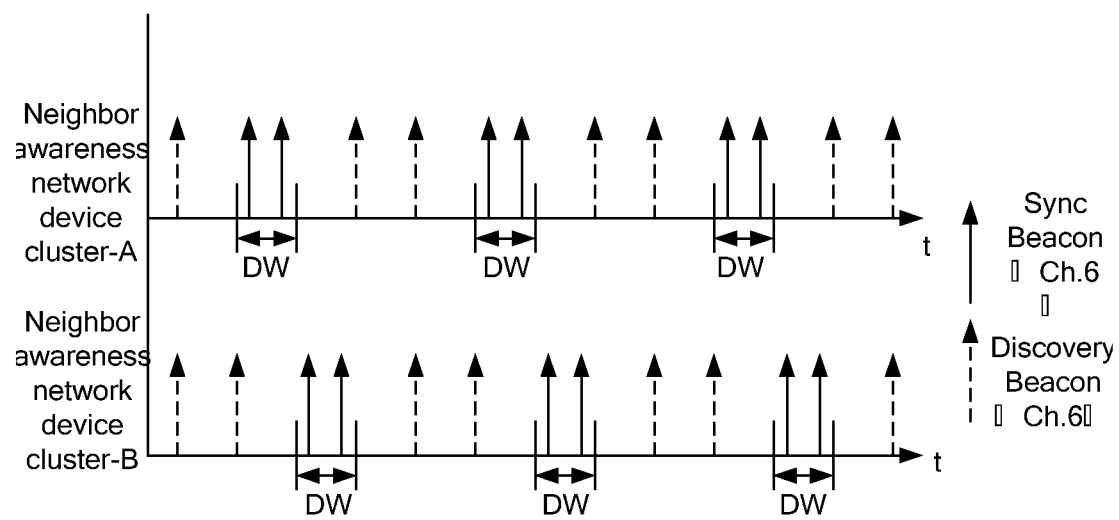
FIG. 3 is a schematic diagram of two neighbor awareness network device clusters that have a same working channel but unaligned DWs according to the prior art.

To make the objectives, technical solutions, and advantages of the present invention clearer, the following further describes the present invention in detail with reference to the accompanying drawings.

To reduce actual working time spent by a wireless device in service search and discovery and reduce power consumption of the wireless device without excessively occupying available resources of a working channel of a neighbor awareness network, an embodiment of the present invention provides a new solution for joining a neighbor awareness network device cluster. When a wireless device in a first neighbor awareness network device cluster discovers another neighbor awareness network device clusters by means of scanning, for example, discovers a second neighbor awareness network device cluster by means of scanning, the wireless device does not join the second neighbor awareness network device cluster according to a conventional technology, but determines, according to acquired attribute information of the second neighbor awareness network device cluster, whether it is necessary to join the second neighbor awareness network device cluster; and when it is necessary to join the second neighbor awareness network device cluster, the wireless device leaves the first neighbor awareness network device cluster and joins the second neighbor awareness network device cluster.

The wireless device leaves (which may also be referred to as exiting) the first neighbor awareness network device cluster means that the wireless device does not participate in contending for serving as a synchronization device in the first neighbor awareness network device cluster any longer. Optionally, in this case, the wireless device may continue to be synchronized to a DW of the first neighbor awareness network device cluster to perform service discovery, or may also not be synchronized to a DW of the first neighbor awareness network device cluster to perform service discovery. The wireless device joins the second neighbor awareness network device cluster means that the wireless device participates in contending for serving as a synchronization device in the second neighbor awareness network device cluster, and is synchronized to the DW of the second neighbor awareness network device cluster to perform service discovery.

In the solution of the embodiment of the present invention, the wireless device does not belong to multiple neighbor awareness network device clusters at the same time, and the wireless device contends for serving as a synchronization device and performs service discovery in a DW both only in a neighbor awareness network device cluster that the wireless device joins. Therefore, the actual working time spent by the wireless device in synchronization and service search and discovery is relatively short, and power consumption of the wireless device is also relatively low. Meanwhile, as time progresses, other wireless devices in the first neighbor awareness network device cluster may also leave the first neighbor awareness network device cluster and join the second neighbor awareness network device cluster according to operations similar to the above; when all wireless devices in the first neighbor awareness network device cluster leave the first neighbor awareness network device cluster and join the second neighbor awareness network device cluster (that is, the first neighbor awareness network device cluster is merged into the second neighbor awareness network device cluster), a DW of the first neighbor awareness network device cluster on the working channel is no longer occupied. Therefore, available resources on the working channel are increased, and correct service search and discovery can be ensured.

The neighbor awareness network device cluster involved in the embodiment of the present invention is a relatively loose wireless network established by direct communication between multiple wireless devices, and the neighbor awareness network device cluster has a cluster identifier (CID) for indicating the cluster.

Wireless devices in the neighbor awareness network device cluster may be classified by functions into:

Anchor Master (anchor master device), having the largest AMR (Anchor Master Rank, anchor master rank), and providing a TSF (time synchronization function);

Master, sending a Sync Beacon carrying cluster attribute information, such as anchor master device information, to implement device synchronization in the network; and further sending a Discovery Beacon to announce existence of a neighbor awareness network device cluster;

Non-Master Sync, configured to send a Sync Beacon carrying cluster attribute information such as anchor master device information, to implement device synchronization in the network; and Non-Master Non-Sync (non-master non-synchronization device), not sending a beacon frame.

The attribute information of the neighbor awareness network device cluster includes: a CID, the number of wireless devices included in the neighbor awareness network device cluster, an anchor master rank in the neighbor awareness network device cluster, a hop count from the wireless device to an anchor master device, transmission time of a beacon frame of an anchor master device, and so on. The Master and Non-Master Sync may be called synchronization devices because they both send a Sync Beacon to perform synchronization.

The neighbor awareness network device cluster synchronizes, by using a beacon frame, a wireless device in the cluster to a DW and a cluster working channel that are specified by the cluster, and the wireless device in the cluster sends a service discovery frame in the DW to implement service discovery between devices in the cluster.

A neighbor awareness network technology defines a working channel (for example, a sixth channel of 2.4 GHz or a channel of 5 GHz). On a working channel of a neighbor awareness network, the wireless device may actively create a neighbor awareness network device cluster, or the wireless device discovers an existing neighbor awareness network device cluster nearby by scanning the working channel of the neighbor awareness network, and joins the neighbor awareness network device cluster.

It should be noted that the wireless device involved in the embodiment of the present invention may be a Wi-Fi device, or a Bluetooth device, and so on.

The following describes the solution of the present invention in detail with reference to specific embodiments.

Embodiment 1

Figure 4:
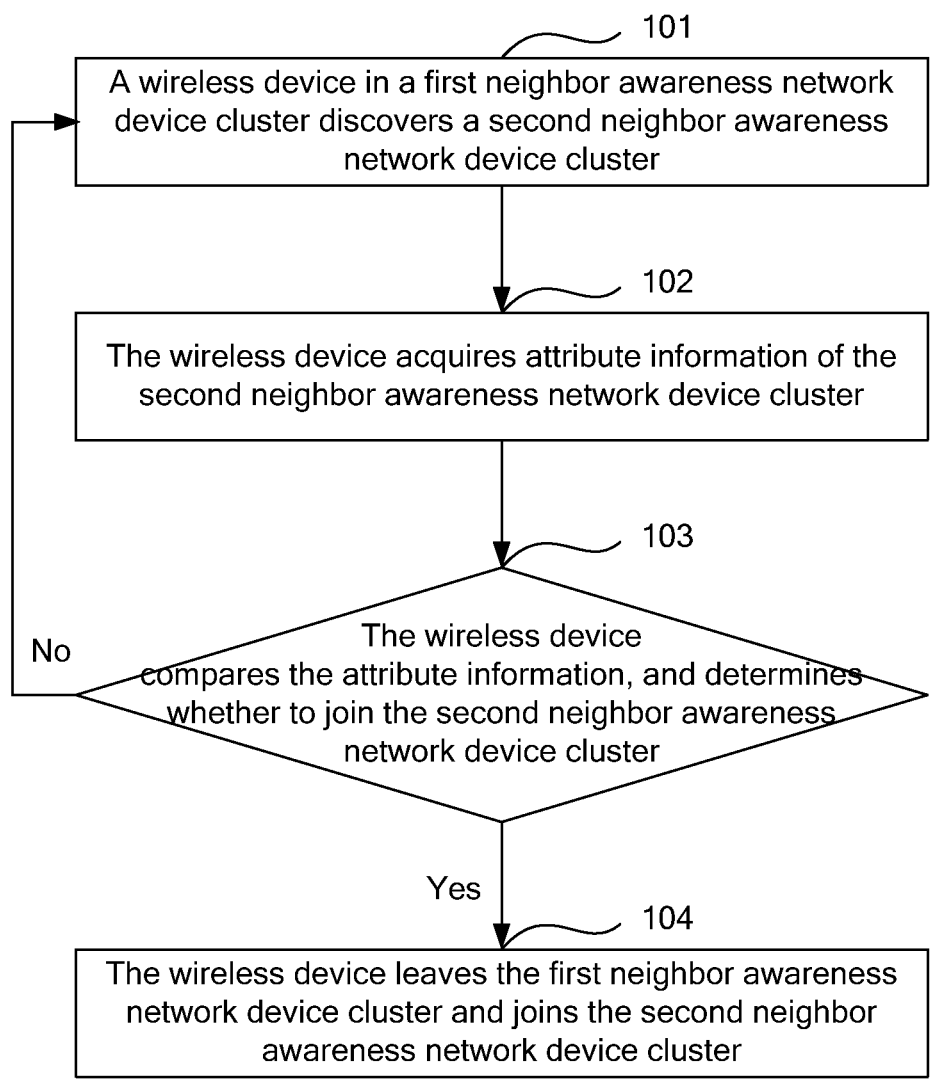
FIG. 4 is a schematic diagram of steps of a method for joining a neighbor awareness network device cluster according to Embodiment 1 of the present invention.

As shown in FIG. 4, which is a schematic diagram of steps of a method for joining a neighbor awareness network device cluster in Embodiment 1 of the present invention, the method includes the following steps:

Step 101: A wireless device in a first neighbor awareness network device cluster discovers a second neighbor awareness network device cluster.

After discovering the first neighbor awareness network device cluster by means of scanning, the wireless device may join the first neighbor awareness network device cluster, and locally record a CID of the first neighbor awareness network device cluster that the wireless device joins.

After joining the first neighbor awareness network device cluster, the wireless device may still listen on a beacon frame or a service frame of a neighbor awareness network on a working channel, where the beacon frame may be a Discovery Beacon or a Sync Beacon, and the service frame may be a Service Discovery Frame.

When a CID included in the beacon frame or the service frame is different from the locally recorded CID of the first neighbor awareness network device cluster (the CID is usually carried in a destination address field of the beacon frame or the service frame), where the beacon frame or the service frame is received by means of listening, it is determined that another neighbor awareness network device cluster other than the first neighbor awareness network device cluster is discovered. The another neighbor awareness network device cluster is called the second neighbor awareness network device cluster in Embodiment 1.

Step 102: The wireless device acquires attribute information of the second neighbor awareness network device cluster.

If the wireless device discovers the second neighbor awareness network device cluster according to the beacon frame or the service frame in the second neighbor awareness network device cluster in step 101, where the beacon frame or the service frame is received by means of listening, in step 102, the wireless device may acquire the attribute information of the second neighbor awareness network device cluster from the beacon frame or the service frame, where the beacon frame or the service frame is received by means of listening.

Assuming that in step 101, when the wireless device obtains, by means of listening, that the CID included in a Sync Beacon is different from the locally recorded CID of the first neighbor awareness network device cluster, the wireless device may acquire the attribute information of the second neighbor awareness network device cluster from the Sync Beacon received by means of listening.

Assuming that in step 101, the wireless device obtains, by means of listening, that CIDs included in the Sync Beacon and the Discovery Beacon are the same, but the CIDs included in the two beacon frames are different from the locally recorded CID of the first neighbor awareness network device cluster, the wireless device may acquire the attribute information of the second neighbor awareness network device cluster from the Sync Beacon and the Discovery Beacon that are received by means of listening.

In addition to acquiring the attribute information of the second neighbor awareness network device cluster from the beacon frame or the service frame, where the beacon frame or the service frame is received by means of listening, the wireless device may also acquire the attribute information of the second neighbor awareness network device cluster according to the definition of the neighbor awareness network technology itself, for example, attribute information such as a working channel of the second neighbor awareness network device cluster, time duration of a DW, and a time interval between DWs may be acquired according to the definition of the neighbor awareness network technology itself.

Attribute information of any neighbor awareness network device cluster includes but is not limited to:
 a CID of the neighbor awareness network device cluster, time duration of a DW in the neighbor awareness network device cluster, a time interval between neighboring DWs in the neighbor awareness network device cluster, a transmission interval of a beacon frame in the neighbor awareness network device cluster, a working channel of the neighbor awareness network device cluster, the number of wireless devices included in the neighbor awareness network device cluster (that is, a scale of the neighbor awareness network device cluster), density of the neighbor awareness network device cluster (density of wireless devices in the neighbor awareness network device cluster), and Anchor Master (an anchor master device) information in the neighbor awareness network device cluster.

The Anchor Master information may include: an AMR (Anchor Master Rank, anchor master rank, that is, the value of the intent that the current Anchor Master wishes to function as the anchor master device), a hop count from the wireless device to the anchor master device in the neighbor awareness network device cluster (Hop Count to Anchor Master), and transmission time of a beacon frame of an Anchor Master in the neighbor awareness network device cluster (Anchor Master Beacon Transmission Time).

It should be noted that as a type of attribute information of the neighbor awareness network device cluster, the CID is not used to reflect a feature of the neighbor awareness network device cluster, but is used as an identifier for uniquely indicating the neighbor awareness network device cluster; but other attribute information may reflect a feature of the neighbor awareness network device cluster from different aspects.

The attribute information of the second neighbor awareness network device cluster that is acquired by the wireless device may include a part or all of the foregoing attribute information. Embodiment 1 of the present invention does not specifically limit content of the attribute information of the second neighbor awareness network device cluster that is acquired by the wireless device.

Step 103: The wireless device compares the attribute information of the second neighbor awareness network device cluster with attribute information of the first neighbor awareness network device cluster, and determines whether it is necessary to join the second neighbor awareness network device cluster; and if it is necessary, performs step 104; or it is not necessary, may go to step 101 and continue to listen on the working channel.

In step 103, the wireless device may use a piece of attribute information to determine whether it is necessary to join the second neighbor awareness network device cluster, or may also use multiple pieces of attribute information to comprehensively determine whether it is necessary to join the second neighbor awareness network device cluster, which is described by the following examples:

Example 1: The wireless device may compare the CID of the second neighbor awareness network device cluster with the CID of the first neighbor awareness network device cluster, and determine, according to a preset determination rule, whether it is necessary to join the second neighbor awareness network device cluster.

Content of the determination rule decides a direction in which the wireless device moves between the first neighbor awareness network device cluster and the second neighbor awareness network device cluster, and further decides a direction of merging between the first neighbor awareness network device cluster and the second neighbor awareness network device cluster. The determination rule may be set according to an actual requirement.

The determination rule may be: when the CID of the second neighbor awareness network device cluster is greater than the CID of the first neighbor awareness network device cluster, it is necessary to join the second neighbor awareness network device cluster. When the determination rule is applied in step 103, when the wireless device determines that the CID of the second neighbor awareness network device cluster is greater than the locally recorded CID of the first neighbor awareness network device cluster, the wireless device determines that it is necessary to join the second neighbor awareness network device cluster.

The determination rule may also be: when the CID of the second neighbor awareness network device cluster is less than the CID of the first neighbor awareness network device cluster, it is necessary to join the second neighbor awareness network device cluster. When the determination rule is applied in step 103, when the wireless device determines that the CID of the second neighbor awareness network device cluster is less than the locally recorded CID of the first neighbor awareness network device cluster, the wireless device determines that it is necessary to join the second neighbor awareness network device cluster.

The CID is a relatively stable parameter in the attribute information of the neighbor awareness network device cluster. Therefore, using the CID to determine whether it is necessary to join the second neighbor awareness network device cluster obtains a more stable determination result than using other parameters that may dynamically change, and is an exemplary determination solution.

Example 2: The wireless device may compare the scale of the second neighbor awareness network device cluster with the scale of the first neighbor awareness network device cluster; according to a rule of merging a small-scale neighbor awareness network device cluster into a large-scale neighbor awareness network device cluster, when the wireless device determines that the scale of the second neighbor awareness network device cluster is larger than the scale of the first neighbor awareness network device cluster, the wireless device determines that it is necessary to join the second neighbor awareness network device cluster.

Example 3: The wireless device may determine, by comprehensively considering the CID and the scale of the neighbor awareness network device cluster, whether it is necessary to join the second neighbor awareness network device cluster, for example, configure weights for the CID and the scale separately, compare the CID of the first neighbor awareness network device cluster with the CID of the second neighbor awareness network device cluster, compare the scale of the first neighbor awareness network device cluster with the scale of the second neighbor awareness network device cluster, and score the first neighbor awareness network device cluster and the second neighbor awareness network device cluster according to results the two comparison. Assuming that the CID of the second neighbor awareness network device cluster is greater than the CID of the first neighbor awareness network device cluster, a weight value configured for the CID may be used as a score of the second neighbor awareness network device cluster; if the scale of the second neighbor awareness network device cluster is larger than the scale of the first neighbor awareness network device cluster, a weight value configured for the scale may also be used as a score of the second neighbor awareness network device cluster. Each score is added up to finally obtain scores of the first neighbor awareness network device cluster and the second neighbor awareness network device cluster. According to a rule of merging a neighbor awareness network device cluster with a smaller score into a neighbor awareness network device cluster with a greater score, the wireless device determines joining the second neighbor awareness network device cluster.

The three examples are optional solutions of step 103. Step 103 is also not limited to the three actions. Other attribute information may also be used to determine whether it is necessary to join the second neighbor awareness network device cluster, for example, compare AMR values, Hop Count values, or transmission time of beacon frames of the anchor master device, and so on of the first neighbor awareness network device cluster and the second neighbor awareness network device cluster to determine whether to join the second neighbor awareness network device cluster.

Step 104: The wireless device leaves the first neighbor awareness network device cluster and joins the second neighbor awareness network device cluster.

A sequence of the wireless device' leaving the first neighbor awareness network device cluster and joining the second neighbor awareness network device cluster in step 104 is not limited. The wireless device may first leave the first neighbor awareness network device cluster and then join the second neighbor awareness network device cluster, or may also first join the second neighbor awareness network device cluster and then leave the first neighbor awareness network device cluster, or may also not care about the sequence of leaving the first neighbor awareness network device cluster and joining the second neighbor awareness network device cluster, but perform conventional leaving and joining processes according to DW-related information of the first neighbor awareness network device cluster and the second neighbor awareness network device cluster.

It should be noted that the wireless device may perform the solution of Embodiment 1 cyclically to perform continuous scanning to discover whether there is another neighbor awareness network device cluster that the wireless device may join, and every time when a neighbor awareness network device cluster that the wireless device needs to join is discovered by means of scanning, leave the current neighbor awareness network device cluster and join the newly discovered neighbor awareness network device cluster.

For example, after the wireless device performs step 104 to leave the first neighbor awareness network device cluster and join the second neighbor awareness network device cluster, the wireless device may, as a member in the second neighbor awareness network device cluster, continue performing the solution of Embodiment 1, that is, continue scanning to check whether another neighbor awareness network device clusters exist, and determine, according to the solution of Embodiment 1, whether to leave the second neighbor awareness network device cluster and join another neighbor awareness network device cluster.

By using the solution of step 101 to step 104, when the wireless device in the first neighbor awareness network device cluster discovers the second neighbor awareness network device cluster by means of scanning, and determines, according to a rule, that it is necessary to join the second neighbor awareness network device cluster, the wireless device leaves the first neighbor awareness network device cluster and joins the second neighbor awareness network device cluster. Because the wireless device does not belong to multiple neighbor awareness network device clusters at the same time, the actual working time spent by the wireless device in synchronization and service search and discovery is short, and power consumption of the device is relatively low.

Figure 5:
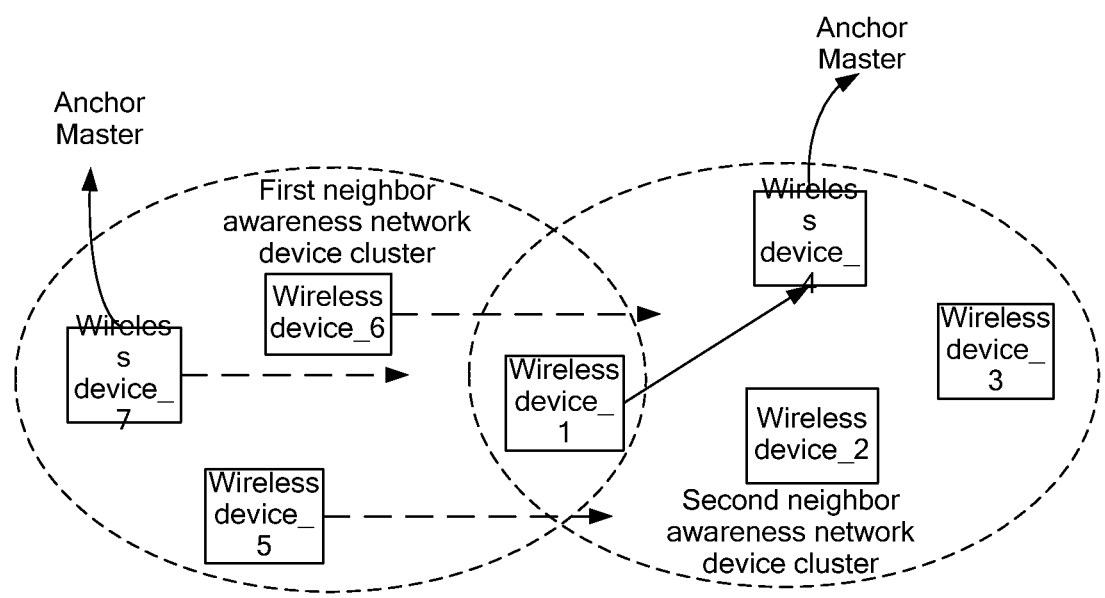
FIG. 5 is a schematic diagram of composition of a neighbor awareness network according to Embodiment 1 of the present invention.

Meanwhile, as time progresses, other wireless devices in the first neighbor awareness network device cluster may also, after discovering the second neighbor awareness network device cluster by means of scanning, leave the first neighbor awareness network device cluster and join the second neighbor awareness network device cluster according to operations similar to the above. Using a schematic diagram of composition of the neighbor awareness network shown in FIG. 5 as an example, wireless device_1 may leave the first neighbor awareness network device cluster and join the second neighbor awareness network device cluster according to the solution of step 101 to step 104. Other wireless devices in the first neighbor awareness network device cluster may also perform the solution of step 101 to step 104. As time progresses, other wireless devices in the first neighbor awareness network device cluster, for example, wireless device_5, wireless device_6, and wireless device_7 may also leave the first neighbor awareness network device cluster and join the second neighbor awareness network device cluster.

When all wireless devices in the first neighbor awareness network device cluster leave the first neighbor awareness network device cluster and join the second neighbor awareness network device cluster (that is, the first neighbor awareness network device cluster is merged into the second neighbor awareness network device cluster), the DW of the first neighbor awareness network device cluster on the working channel is not occupied. Therefore, available resources on the working channel are increased, and service search and discovery can be ensured.

In the solution of Embodiment 1, in the process in which any wireless device in the first neighbor awareness network device cluster leaves the first neighbor awareness network device cluster and joins the second neighbor awareness network device cluster, other wireless devices in the first neighbor awareness network device cluster are not actively notified. Each wireless device itself performs scanning and discovery, and selects, according to a rule, to join a neighbor awareness network device cluster. This solution has relatively low requirements for capabilities of the wireless devices, and is simple and easy to implement.

Considering that in the solution of Embodiment 1, the process in which the first neighbor awareness network device cluster is merged into the second neighbor awareness network device cluster is relatively slow, to improve efficiency of the wireless device' moving between multiple neighbor awareness network device clusters, on the basis of Embodiment 1, Embodiment 2 of the present invention further proposes that a wireless device leaving the first neighbor awareness network device cluster should send, in the first neighbor awareness network device cluster, an event message about joining the second neighbor awareness network device cluster, so that wireless devices in the first neighbor awareness network device cluster that receive the event message are capable of joining the second neighbor awareness network device cluster quickly, and that efficiency of merging the first neighbor awareness network device cluster into the second neighbor awareness network device cluster is improved. The following describes the solution of Embodiment 2 in detail. The event message may be a unicast message for a wireless device, a multicast message for a neighbor awareness network device cluster, or a broadcast message for a neighbor awareness network device cluster.

Embodiment 2

Figure 6:
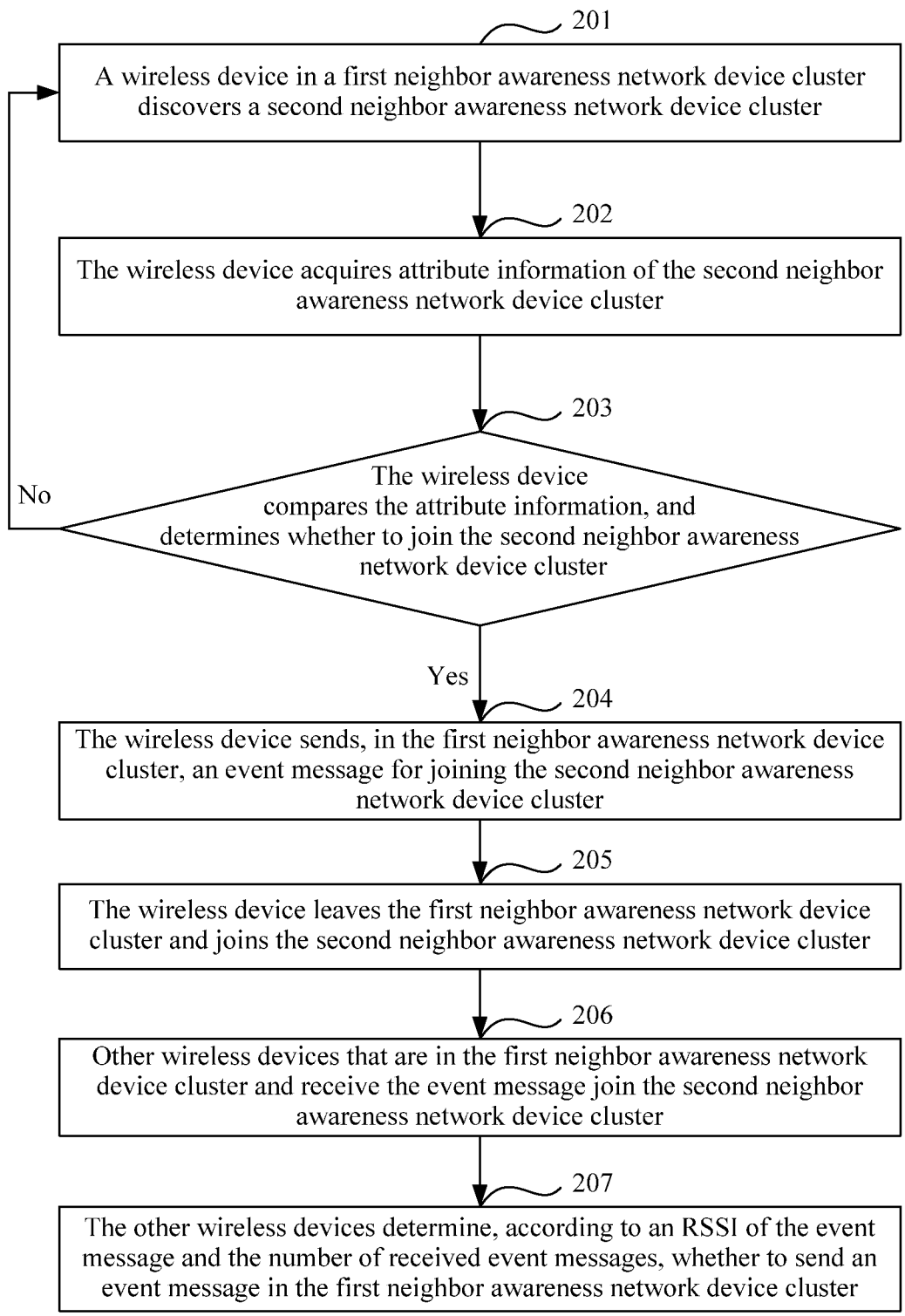
FIG. 6 is a schematic diagram of steps of a method for joining a neighbor awareness network device cluster according to Embodiment 2 of the present invention.

As shown in FIG. 6, which is a schematic diagram of steps of a method of Embodiment 2 of the present invention, the method includes the following steps:

Content of step 201 to step 203 is similar to content of step 101 to step 103 in Embodiment 1, and is not repeated herein. Reference may be made to the foregoing content.

Step 204: The wireless device sends, in the first neighbor awareness network device cluster, an event message about joining the second neighbor awareness network device cluster.

The wireless device performs the solution of step 204 when determining joining the second neighbor awareness network device cluster, that is, the wireless device may perform step 204 after joining the second neighbor awareness network device cluster, may perform step 204 before joining the second neighbor awareness network device cluster, or may perform step 204 when joining the second neighbor awareness network device cluster. There may be no sequence between the time the wireless device joins the second neighbor awareness network device cluster and step 204, and the sequence is not limited by the present invention.

In addition, the wireless device needs to send the event message in the first neighbor awareness network device cluster in step 204; therefore, before step 204 is performed, the wireless device should not leave the first neighbor awareness network device cluster; after step 204 is performed, the wireless device may perform an operation of leaving the first neighbor awareness network device cluster.

The event message includes attribute information of the second neighbor awareness network device cluster, so that other wireless devices in the first neighbor awareness network device cluster that receive the event message are capable of joining the second neighbor awareness network device cluster quickly according to the attribute information of the second neighbor awareness network device cluster.

The attribute information of the second neighbor awareness network device cluster that is included in the event message may be a part or all of the attribute information of the second neighbor awareness network device cluster that is acquired by the wireless device in step 202. Preferably, key attribute information of the second neighbor awareness network device cluster that is acquired by the wireless device in step 202, for example, attribute information such as a CID, anchor master device information (including an anchor master rank, a hop count to an anchor master device, and transmission time of a beacon frame of an anchor master device), and density of cluster devices, is included in the event message, so that other wireless devices in the first neighbor awareness network device cluster that receive the event message are capable of joining the second neighbor awareness network device cluster quickly according to the attribute information of the second neighbor awareness network device cluster that is included in the event message.

Step 205: The wireless device leaves the first neighbor awareness network device cluster and joins the second neighbor awareness network device cluster.

This step may be divided into two processes: The process of the wireless device' joining the second neighbor awareness network device cluster may be performed any time after step 203 of Embodiment 2, and the process of the wireless device' leaving the first neighbor awareness network device cluster may be performed any time after step 204. In Embodiment 2, step 205 is used as an example to describe the processes of the wireless device' leaving the first neighbor awareness network device cluster and joining the second neighbor awareness network device cluster.

Step 206: Other wireless devices in the first neighbor awareness network device cluster that receive the event message join the second neighbor awareness network device cluster.

The other wireless devices receiving the event message may acquire the attribute information of the second neighbor awareness network device cluster from the received event message, and the other wireless devices may determine, according to the manner described in step 203 or step 103, whether it is necessary to join the second neighbor awareness network device cluster, for example, determine, according to the CID, scale, and so on, whether it is necessary to join the second neighbor awareness network device cluster.

When determining that it is necessary to join the second neighbor awareness network device cluster, the other wireless devices leave the first neighbor awareness network device cluster and join the second neighbor awareness network device cluster. Embodiment 2 does not limit a sequence of the other wireless devices' leaving the first neighbor awareness network device cluster and joining the second neighbor awareness network device cluster.

Further, in another embodiment, step 207 may be included: The other wireless devices determine, according to a received signal strength indicator (RSSI) of the event message and the number of received event messages, whether to send, in the first neighbor awareness network device cluster, an event message about joining the second neighbor awareness network device cluster.

When the other wireless devices determine joining the second neighbor awareness network device cluster, a sequence between the other wireless devices' joining the second neighbor awareness network device cluster and continuing to propagate the event message in the first neighbor awareness network device cluster is not limited. For a sequence between the three processes of the other wireless devices' leaving the first neighbor awareness network device cluster, joining the second neighbor awareness network device cluster, and continuing to propagate the event message in the first neighbor awareness network device cluster, reference may be made to the related description in step 205.

When the other wireless devices determine leaving the first neighbor awareness network device cluster and joining the second neighbor awareness network device cluster, the other wireless devices may continue to propagate, in the first neighbor awareness network device cluster, the event message about joining the second neighbor awareness network device cluster, so that remaining other wireless devices in the first neighbor awareness network device cluster are capable of joining the second neighbor awareness network device cluster quickly according to the event message.

Specifically, the other wireless devices may determine, according to received signal strength of the received event message and the number of received event messages, whether to continue to propagate the event message. The purpose is as follows:

when the received signal strength of the received event message is significantly strong, it indicates that a distance between the other wireless devices receiving the event message and the wireless device sending the event message is relatively short, and devices around the other wireless devices receiving the event message are also capable of receiving the event message; therefore, the other wireless devices receiving the event message do not need to continue to propagate the event message;

when the received signal strength of the received event message is significantly weak, it indicates that a distance between the other wireless devices receiving the event message and the wireless device sending the event message is relatively long, and the other wireless devices receiving the event message need to continue to propagate the event message; and when the received signal strength of the received event message is between significantly strong and significantly weak, the other wireless devices receiving the event message continue to determine whether the number of received event messages is enough (for example, whether the number reaches a threshold), and if the number of received event messages is enough, it indicates that although the distance between the other wireless devices receiving the event message and the wireless device sending the event message is not short; however, a large number of devices around have propagated the event message again, and therefore, it is unnecessary to continue to propagate the event message; if the number of received event messages is not enough, it indicates that the distance between the other wireless devices receiving the event message and the wireless device sending the event message is not short, and few devices have propagated the event message again, and therefore, it is necessary to continue to propagate the event message.

Figure 7:
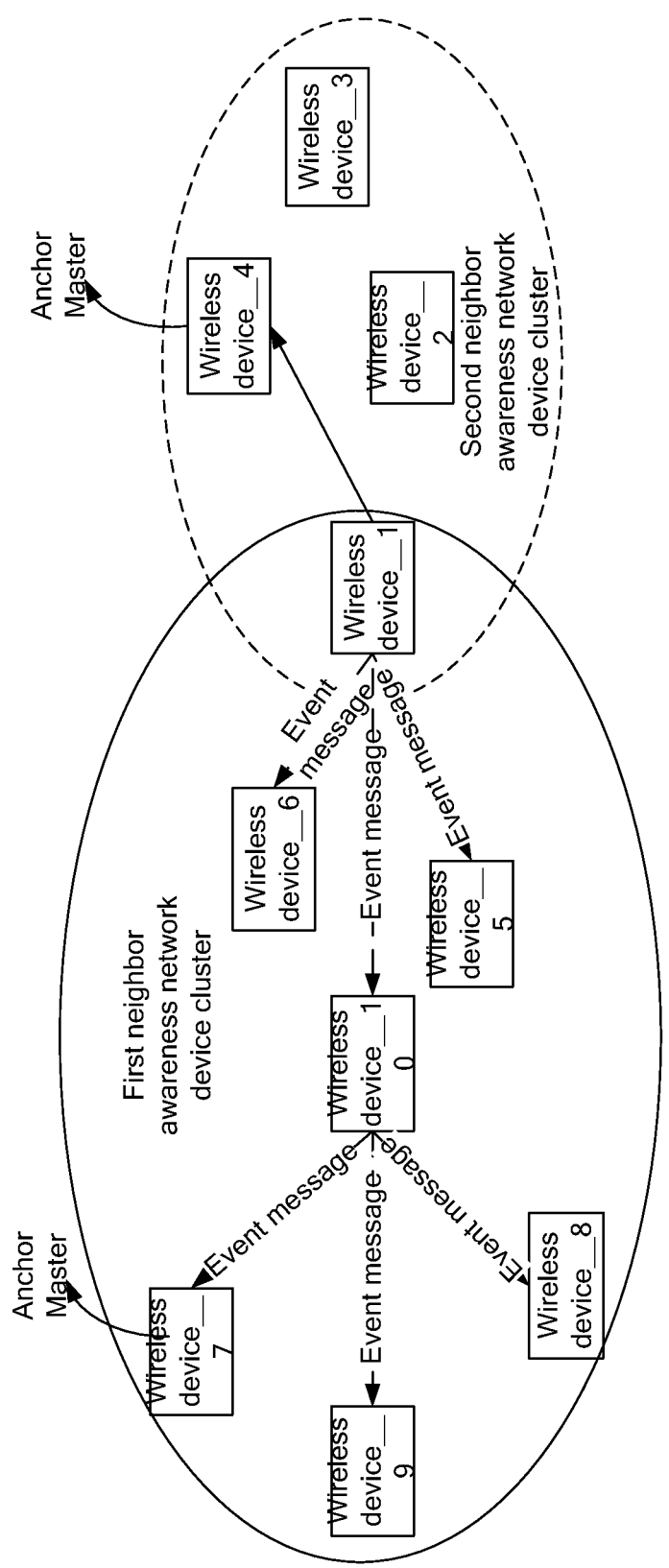
FIG. 7 is a schematic diagram of composition of a neighbor awareness network according to Embodiment 2 of the present invention.

Using a schematic diagram of composition of a neighbor awareness network shown in FIG. 7 as an example, in step 204, after wireless device_1 sends an event message to a first neighbor awareness network device cluster in a next DW of the first neighbor awareness network device cluster, wireless device_5, wireless device_6, and wireless device_10 all receive the event message. Assuming that received signal strength of the event message received by wireless device_5 and wireless device_6 is higher than a first threshold, it is unnecessary to continue to propagate the event message in the first neighbor awareness network device cluster. However, received signal strength of the event message received by wireless device_10 is lower than the first threshold but higher than a second threshold (the first threshold is higher than the second threshold, where the first threshold may be regarded as significantly strong received signal strength, and the second threshold may be regarded as significantly weak received signal strength), and the number of received event messages is one (lower than the threshold). Therefore, wireless device_10 needs to propagate the event message in the first neighbor awareness network device cluster in step 207. Specifically, wireless device_10 may send the event message in the next DW of the first neighbor awareness network device cluster.

Assuming that the event message sent by wireless device_10 is received by wireless device_7, wireless device_8, and wireless device_9, where received signal strength of the event message received by wireless device_7 and wireless device_8 is higher than the first threshold, it is unnecessary to continue to propagate the event message in the first neighbor awareness network device cluster. However, received signal strength of the event message received by wireless device_9 is lower than the first threshold but higher than the second threshold, and the number of received event messages is one. Therefore, wireless device_9 needs to continue to propagate the event message in the first neighbor awareness network device cluster. Specifically, wireless device_9 may send the event message in the next DW of the first neighbor awareness network device cluster. As can be seen from the above, in a case shown in FIG. 7, after three DWs, the first neighbor awareness network device cluster may be merged into the second neighbor awareness network device cluster.

In step 207, the other wireless devices receiving the event message may directly continue to send the received event message in the first neighbor awareness network device cluster, or may also re-create an event message in other forms to send the event message in the first neighbor awareness network device cluster.

The event message involved in Embodiment 2 includes but is not limited to the following two forms:

Form 1:

The event message is a beacon frame or a service frame of a neighbor awareness network, where the beacon frame or the service frame includes the attribute information of the second neighbor awareness network device cluster.

A Sync Beacon including the attribute information of the second neighbor awareness network device cluster is used as an example of the event message. The event message sent in the first neighbor awareness network device cluster by the wireless device is a Sync Beacon generated for the first neighbor awareness network device cluster. Table 1 is a frame structure of a conventional Sync Beacon.

TABLE 1

| FC | Duration | A1 | A2 | A3 | Seq. Ctrl | Time Stamp | Beacon Interval | Capability | NAN IE | FCS |
|---|---|---|---|---|---|---|---|---|---|---| where:

FC: a frame control field (Frame Control);

Duration: a duration field;

A1: an address 1, which is an ID of a neighbor awareness network device cluster that is defined by the Wi-Fi Alliance;

A2: an address 2, which is an address of a sender;

A3: an address 3, which is a cluster identifier of the neighbor awareness network device cluster, namely, a CID field, used to indicate a neighbor awareness network device cluster to which the wireless device belongs;

SeqCtrol: sequence control;

Time Stamp: a timestamp of a beacon frame;

Beacon Interval: a time interval of the beacon frame;

Capability: capability information;

NAN IE: an attribute information field of a neighbor awareness network, carrying attribute information of the neighbor awareness network device cluster; and FCS: frame check sequence.

The wireless device makes the following modifications to the conventional Sync Beacon generated for the first neighbor awareness network device cluster, to obtain an event message sent in the first neighbor awareness network device cluster:

(1) carrying the CID of the second neighbor awareness network device cluster in the destination address field (namely, the A3 field), where the CID is used to indicate to the other wireless devices receiving the event message that the event message is used for propagating the second neighbor awareness network device cluster; and (2) carrying the attribute information of the second neighbor awareness network device cluster in the attribute information field of the neighbor awareness network, so that a wireless device receiving the event message modifies locally recorded attribute information of the first neighbor awareness network device cluster to the attribute information of the second neighbor awareness network device cluster.

By modifying the foregoing two parts, the wireless device receiving the event message may first determine, according to the CID, whether to join the second neighbor awareness network device cluster, and after determining joining the second neighbor awareness network device cluster, update the locally recorded attribute information of the neighbor awareness network device cluster.

The Sync Beacon is used as an example for description above. The processing manner for an event message that is a Discovery Beacon including the attribute information of the second neighbor awareness network device cluster is the same as the processing manner for the Sync Beacon.

A Service Discovery Frame including the attribute information of the second neighbor awareness network device cluster is used as an example of the event message. The event message sent in the first neighbor awareness network device cluster by the wireless device is a Service Discovery Frame generated for the first neighbor awareness network device cluster. Table 2 is a frame structure of a conventional Service Discovery Frame.

TABLE 2

| 2 | 2 | 6 | 6 | 6 | 2 | 4 | 0-2320 | 4 |
|---|---|---|---|---|---|---|---|---|
| Frame Control | Duration | A1 | A2 | A3 | Seq. Ctrl | HT Ctrl | Frame Body | FCS |

Definitions of a format for a frame body (Frame Body) part is listed in Table 3:

TABLE 3

| Field | Size (Octets) | Value (Hex) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | TBD by WFA | Identifying the type and version of the NAN |
| NAN Attributes | Variable | Variable | One or more NAN Attributes | where:

Category: a type of a Public Action Frame;

Action Field: an action field, a type of which is defined by a vendor;

OUI: an organization identifier, specified by the Wi-Fi Alliance;

OUI Type: an organization type; and

NAN Attributes: an attribute information field of a neighbor awareness network.

The wireless device makes the following modifications to the conventional Service Discovery Frame generated for the first neighbor awareness network device cluster, to obtain an event message sent in the first neighbor awareness network device cluster:

(1) carrying the CID of the second neighbor awareness network device cluster in the destination address field (namely, the A3 field), where the CID is used to indicate to the other wireless devices receiving the event message that the event message is used for propagating the second neighbor awareness network device cluster; and (2) carrying the attribute information of the second neighbor awareness network device cluster in the attribute information field of the neighbor awareness network in the frame body, so that a wireless device receiving the event message modifies locally recorded attribute information of the first neighbor awareness network device cluster to the attribute information of the second neighbor awareness network device cluster.

By modifying the foregoing two parts, the wireless device receiving the event message may first determine, according to the CID, whether to join the second neighbor awareness network device cluster, and after determining joining the second neighbor awareness network device cluster, update the locally recorded attribute information of the neighbor awareness network device cluster.

Form 2:

The event message is a beacon frame or a service frame of a neighbor awareness network, where the beacon frame or the service frame includes merging indication information, and the merging indication information is used to instruct wireless devices in the first neighbor awareness network device cluster that receive the event message to join the second neighbor awareness network device cluster specified by the merging indication information.

The merging indication information may include the CID of the second neighbor awareness network device cluster, where the CID is used for instructing the wireless devices receiving the event message to join the second neighbor awareness network device cluster indicated by the CID.

A Sync Beacon including the merging indication information is used as an example of the event message. Merging indication information (Cluster Merging Attribute) may be added to a NAN IE of the Sync Beacon. Specific definitions may be listed in Table 4:

TABLE 4

| Field | Size (octets) | Value | Description |
| --- | --- | --- | --- |
| Attribute ID | 1 | 0x09 | Identifies the type of NAN attribute. |
| Length | 1 | 6 | Length of the following fields in the attribute. |
| Merging Cluster ID | 6 | Variable | The Cluster ID to be merged to | where:
Attribute ID: an ID value of merging indication information;
Length: a length of merging indication information; and
Merging Cluster ID: a CID of a cluster to be merged into.

Other attribute information of the second neighbor awareness network device cluster may be included in the field designed for the merging indication information, or may also be included in the NAN IE field.

In the solution of Embodiment 2, any wireless device may send an event message in the first neighbor awareness network device cluster according to either of the foregoing forms.

By using the solution of Embodiment 2 of the present invention, based on an effect of the solution of Embodiment 1, the wireless device itself not only leaves the first neighbor awareness network device cluster and joins the second neighbor awareness network device cluster, but also propagates, in the first neighbor awareness network device cluster, the event message about joining the second neighbor awareness network device cluster, so that other wireless devices in the first neighbor awareness network device cluster may quickly join the second neighbor awareness network device cluster, and that the first neighbor awareness network device cluster is quickly merged into the second neighbor awareness network device cluster. The foregoing method may also be used to implement quick merging of multiple (more than two) neighbor awareness network device clusters.

Embodiment 1 and Embodiment 2 are described by using an example in which, when discovering a second neighbor awareness network device cluster, a wireless device in a first neighbor awareness network device cluster leaves the first neighbor awareness network device cluster and joins the second neighbor awareness network device cluster. Actually, when a wireless device (which may be a wireless device that has joined a neighbor awareness network device cluster, or may also be a wireless device that has not joined any neighbor awareness network device cluster) discovers multiple neighbor awareness network device clusters by means of scanning, the wireless device may also not join any one of the neighbor awareness network device clusters, but actively create a new neighbor awareness network device cluster, requiring that discovered other neighbor awareness network device clusters be merged into the created new neighbor awareness network device cluster. In this case, when discovering multiple neighbor awareness network device clusters, the wireless device joins only the new neighbor awareness network device cluster created by the wireless device itself. Therefore, it is ensured that actual working time spent by the wireless device in synchronization and service search and discovery is relatively short, and that power consumption is relatively low. Meanwhile, as time progresses, other wireless devices in each neighbor awareness network device cluster that are discovered by the wireless device may also join the created new neighbor awareness network device cluster, so that DWs of the discovered multiple neighbor awareness network device clusters on the working channel are released, available resources on the working channel are increased, and service search and discovery can be ensured. Embodiment 3 is used for description as follows.

Embodiment 3

Figure 8:
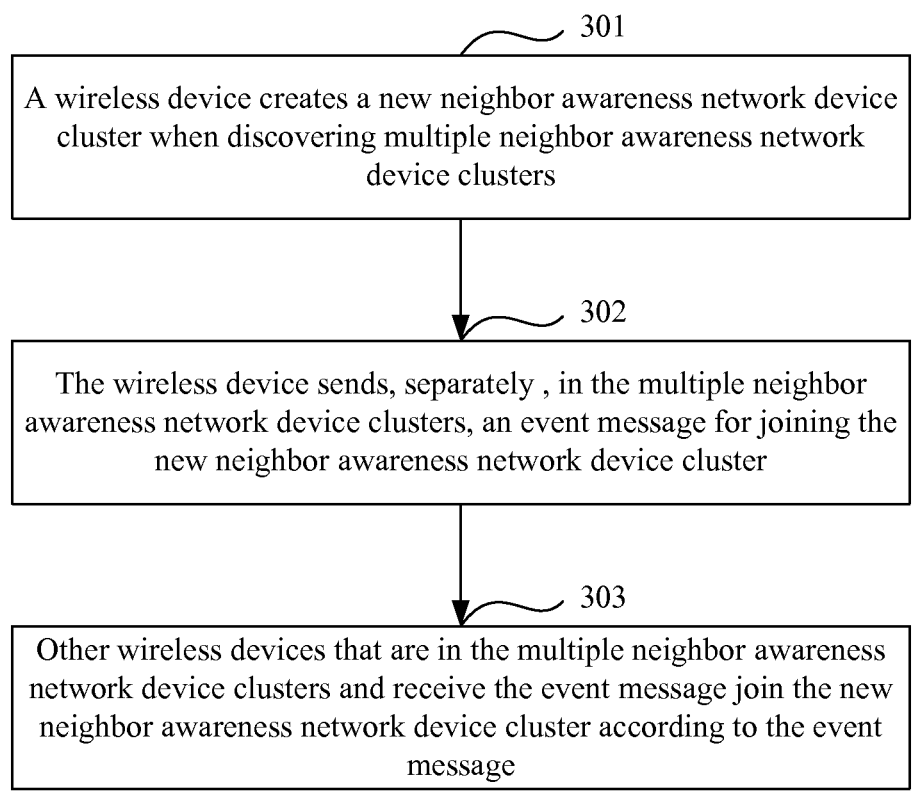
FIG. 8 is a schematic diagram of steps of a method for joining a neighbor awareness network device cluster according to Embodiment 3 of the present invention.

As shown in FIG. 8, which is a schematic diagram of steps of a method of Embodiment 3 of the present invention, the method includes the following steps:

Step 301: A wireless device creates a new neighbor awareness network device cluster when discovering multiple neighbor awareness network device clusters.

In step 301, the wireless device may be a wireless device that has not joined any neighbor awareness network device cluster. When discovering multiple neighbor awareness network device clusters in a process of discovering a neighbor awareness network device cluster, the wireless device may not join any one of the discovered neighbor awareness network device clusters, but create a new neighbor awareness network device cluster.

Optionally, Embodiment 3 of the present invention may also be based on the solutions of Embodiment 1 and Embodiment 2. Assuming that the wireless device in a first neighbor awareness network device cluster discovers a second neighbor awareness network device cluster, the wireless device may determine, according to the solutions of Embodiment 1 and Embodiment 2, whether to join the second neighbor awareness network device cluster. If the wireless device uses different parameters in attribute information to determine whether to join the second neighbor awareness network device cluster, different determination results are obtained for the different parameters. In this case, the solution of Embodiment 3 may also be performed, and the wireless device actively creates a new neighbor awareness network device cluster.

For example, in the solutions of Embodiment 1 and Embodiment 2, the wireless device in the first neighbor awareness network device cluster determines, according to a CID, that it is necessary to join the second neighbor awareness network device cluster (for example, when the CID of the second neighbor awareness network device cluster is greater than the CID of the first neighbor awareness network device cluster, it is necessary to join the second neighbor awareness network device cluster), but determines, according to a scale of the neighbor awareness network device cluster, not to join the second neighbor awareness network device cluster (for example, when the scale of the second neighbor awareness network device cluster is less than that of the first neighbor awareness network device cluster, not to join the second neighbor awareness network device cluster). Therefore, the wireless device may not perform the solutions of Embodiment 1 and Embodiment 2 any longer, but perform the solution of Embodiment 3.

Because a purpose of the new neighbor awareness network device cluster created by the wireless device is to enable the discovered multiple neighbor awareness network device clusters to be merged into the created new neighbor awareness network device cluster, and ensure, when attribute information of the new neighbor awareness network device cluster created by the wireless device is compared with attribute information of any one of the discovered neighbor awareness network device clusters, that a comparison result is to join the created new neighbor awareness network device cluster. Therefore, the attribute information of the new neighbor awareness network device cluster created by the wireless device needs to meet some preset conditions.

For example, the attribute information is a CID. A CID of the new neighbor awareness network device cluster created by the wireless device and CIDs of the multiple neighbor awareness network device clusters meet a preset condition.

The preset condition may be: the CID of the created new neighbor awareness network device cluster is greater than the CID of any one of the multiple neighbor awareness network device clusters, so that when the device determines, according to the CID, whether to join the created new neighbor awareness network device cluster, the device joins a neighbor awareness network device cluster of a greater CID according to a determination rule, thereby ensuring that the device joins the created new neighbor awareness network device cluster.

The preset condition may also be: the CID of the created new neighbor awareness network device cluster is less than the CID of any one of the multiple neighbor awareness network device clusters, so that when the device determines, according to the CID, whether to join the created new neighbor awareness network device cluster, the device joins a neighbor awareness network device cluster of a smaller CID according to a determination rule, thereby ensuring that the device joins the created new neighbor awareness network device cluster.

In addition, to reduce impact on the existing neighbor awareness network device cluster, transmission time of a beacon frame of an anchor master device in the new neighbor awareness network device cluster created by the wireless device may be the same as transmission time of a beacon frame of an anchor master device in one of the multiple neighbor awareness network device clusters. In this way, the impact caused by same transmission time of the beacon frame of the anchor master device to the neighbor awareness network device cluster may be reduced.

Step 302: The wireless device sends, separately in the multiple neighbor awareness network device clusters, an event message about joining the new neighbor awareness network device cluster, where the event message includes attribute information of the new neighbor awareness network device cluster.

The event message may be a unicast message for a wireless device, or a multicast message or a broadcast message for a neighbor awareness network device cluster.

The implementation manner of sending an event message about joining the new neighbor awareness network device cluster to any neighbor awareness network device cluster is the same as the implementation manner in Embodiment 2.

Step 303: Other wireless devices that are in the multiple neighbor awareness network device clusters and receive the event message join the new neighbor awareness network device cluster according to the event message.

The action of the other wireless devices receiving the event message in joining the new neighbor awareness network device cluster, and the action of whether to propagate the event message in the neighbor awareness network device cluster that the other wireless devices are to leave, are the same as the implementation manner in Embodiment 2.

Figure 9:
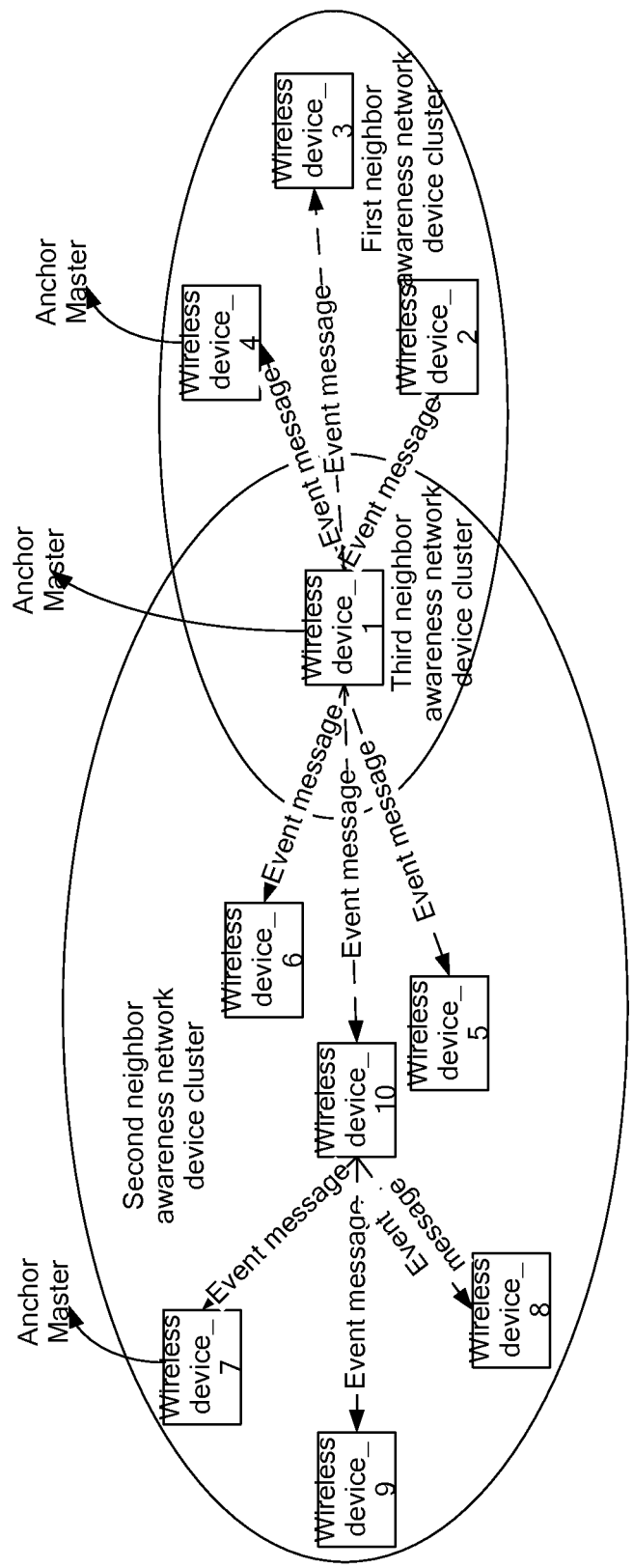
FIG. 9 is a schematic diagram of composition of a neighbor awareness network according to Embodiment 3 of the present invention.

Using a schematic diagram of composition of a neighbor awareness network shown in FIG. 9 as an example, after discovering a second neighbor awareness network device cluster, wireless device_1 joining a first neighbor awareness network device cluster determines, according to a CID and a scale, whether to join the second neighbor awareness network device cluster. Assuming that wireless device_1 determines, according to the CID, that it is unnecessary to join the second neighbor awareness network device cluster (assuming that a determination rule is to join a neighbor awareness network device cluster of a greater CID), but determines, according to the scale, that it is necessary to join the second neighbor awareness network device cluster, wireless device_1 leaves the first neighbor awareness network device cluster but does not join the second neighbor awareness network device cluster, but actively creates a third neighbor awareness network device cluster, and becomes an Anchor Master in the third neighbor awareness network device cluster. In this case, a CID of the third neighbor awareness network device cluster is greater than CIDs of the first neighbor awareness network device cluster and the second neighbor awareness network device cluster, and transmission time of a beacon frame of an anchor master device is the same as that of the second neighbor awareness network device cluster. Then, separately in the first neighbor awareness network device cluster and the second neighbor awareness network device cluster, the wireless device propagates an event message about joining the third neighbor awareness network device cluster, so that each wireless device in the first neighbor awareness network device cluster and the second neighbor awareness network device cluster leaves the first neighbor awareness network device cluster and the second neighbor awareness network device cluster according to the received event message, and joins the third neighbor awareness network device cluster. Because transmission time of the beacon frame of the anchor master device in the third neighbor awareness network device cluster is the same as that in the second neighbor awareness network device cluster, each wireless device joining the third neighbor awareness network device cluster performs synchronization and service query and discovery according to transmission time of a beacon frame of an anchor master device similar to the transmission time of the beacon frame of the anchor master device in the original second neighbor awareness network device cluster.

Embodiment 4

Figure 10:
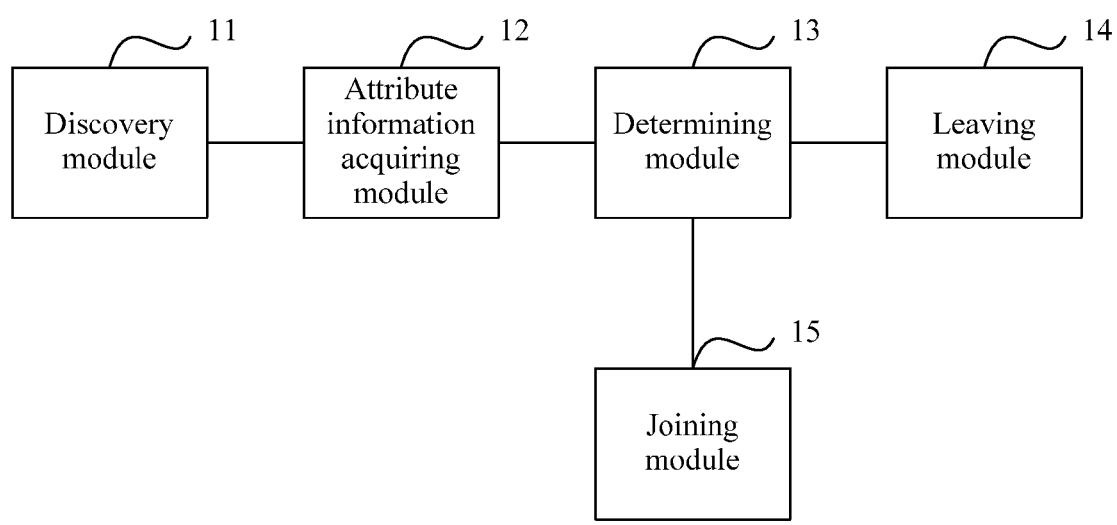
FIG. 10(*a*) and FIG. 10(*b*) are schematic structural diagrams of a wireless device according to Embodiment 4 of the present invention.
Figure 10:
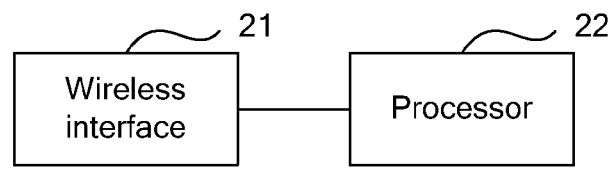

Embodiment 4 of the present invention describes a wireless device for joining a neighbor awareness network device cluster, which is of a same inventive concept as Embodiment 1. As shown in FIG. 10(a), the wireless device in a first neighbor awareness network device cluster includes a discovery module 11, an attribute information acquiring module 12, a determining module 13, a leaving module 14, and a joining module 15.

The discovery module 11 is configured to discover a neighbor awareness network device cluster. In the solution of Embodiment 4, the discovery module 11 may discover a second neighbor awareness network device cluster according to the manner of step 101 in Embodiment 1.

The attribute information acquiring module 12 is configured to acquire attribute information of the second neighbor awareness network device cluster when the discovery module 11 discovers a second neighbor awareness network device cluster. In the solution of Embodiment 4, the attribute information acquiring module 12 may acquire the attribute information of the second neighbor awareness network device cluster according to the manner of step 102 in Embodiment 1.

The determining module 13 is configured to compare the attribute information of the second neighbor awareness network device cluster with attribute information of the first neighbor awareness network device cluster to determine whether it is necessary to join the second neighbor awareness network device cluster. In the solution of Embodiment 4, the determining module 13 may determine, according to the manner and the determination rule of step 103 in Embodiment 1, whether it is necessary to join the second neighbor awareness network device cluster.

The leaving module 14 is configured to leave the first neighbor awareness network device cluster when the determining module 13 determines that it is necessary to join the second neighbor awareness network device cluster.

The joining module 15 is configured to join the second neighbor awareness network device cluster when the determining module 13 determines that it is necessary to join the second neighbor awareness network device cluster.

Embodiment 4 of the present invention does not limit an execution sequence of the leaving module 14 and joining module 15.

Preferably, when a cluster identifier included in a received beacon frame or service frame of a neighbor awareness network is different from a locally recorded cluster identifier of the first neighbor awareness network device cluster, the discovery module 11 is specifically configured to determine that the second neighbor awareness network device cluster is discovered; and the attribute information acquiring module 12 is specifically configured to acquire the attribute information of the second neighbor awareness network device cluster from the received beacon frame or service frame of the neighbor awareness network.

Preferably, the attribute information of the second neighbor awareness network device cluster includes at least one type of the following information:

a CID of the second neighbor awareness network device cluster, the number of wireless devices included in the second neighbor awareness network device cluster, an anchor master rank in the second neighbor awareness network device cluster, a hop count from the wireless device to an anchor master device in the second neighbor awareness network device cluster, and transmission time of a beacon frame of the anchor master device in the second neighbor awareness network device cluster.

Preferably, the determining module 13 is specifically configured to compare the cluster identifier of the second neighbor awareness network device cluster with the locally recorded cluster identifier of the first neighbor awareness network device cluster, and determine, according to a preset determination rule, whether it is necessary to join the second neighbor awareness network device cluster.

The determination rule is specifically: when the CID of the second neighbor awareness network device cluster is greater than the CID of the first neighbor awareness network device cluster, it is necessary to join the second neighbor awareness network device cluster; or the determination rule is specifically: when the CID of the second neighbor awareness network device cluster is less than the CID of the first neighbor awareness network device cluster, it is necessary to join the second neighbor awareness network device cluster.

Preferably, the leaving module 14 is specifically configured not to participate in contending for serving as a synchronization device in the first neighbor awareness network device cluster any longer; and the joining module 15 is specifically configured to participate in contending for serving as a synchronization device in the second neighbor awareness network device cluster, and be synchronized to a discovery window of the second neighbor awareness network device cluster to perform service discovery.

The wireless device in Embodiment 4 has a function of implementing each step in Embodiment 1, which is not repeated herein.

Embodiment 4 of the present invention further describes a wireless device for joining a neighbor awareness network device cluster, which is of a same inventive concept as Embodiment 1. As shown in FIG. 10(b), the wireless device in a first neighbor awareness network device cluster includes: a wireless interface 21 and a processor 22.

The wireless interface 21 is configured to scan a neighbor awareness network device cluster.

The processor 22 is configured to discover a second neighbor awareness network device cluster according to a scanning result of the wireless interface 21, and acquire attribute information of the second neighbor awareness network device cluster; compare the attribute information of the second neighbor awareness network device cluster with attribute information of the first neighbor awareness network device cluster to determine whether it is necessary to join the second neighbor awareness network device cluster; and when a determination result is that it is necessary to join the second neighbor awareness network device cluster, leave the first neighbor awareness network device cluster, and join the second neighbor awareness network device cluster.

Preferably, the wireless interface 21 is specifically configured to scan a beacon frame or a service frame of a neighbor awareness network; and the discovering a second neighbor awareness network device cluster according to a scanning result of the wireless interface 21, and acquiring attribute information of the second neighbor awareness network device cluster are specifically: when a CID included in a beacon frame or a service frame of a neighbor awareness network that is scanned by the wireless interface 21 is different from a locally recorded CID of the first neighbor awareness network device cluster, determining that the second neighbor awareness network device cluster is discovered; and acquiring the attribute information of the second neighbor awareness network device cluster from the received beacon frame or service frame of the neighbor awareness network.

Preferably, the attribute information of the second neighbor awareness network device cluster includes at least one type of the following information:

a CID of the second neighbor awareness network device cluster, the number of wireless devices included in the second neighbor awareness network device cluster, an anchor master rank in the second neighbor awareness network device cluster, a hop count from the wireless device to an anchor master device in the second neighbor awareness network device cluster, and transmission time of a beacon frame of the anchor master device in the second neighbor awareness network device cluster.

Preferably, the comparing the attribute information of the second neighbor awareness network device cluster with attribute information of the first neighbor awareness network device cluster to determine whether it is necessary to join the second neighbor awareness network device cluster are specifically: comparing the CID of the second neighbor awareness network device cluster with the locally recorded CID of the first neighbor awareness network device cluster, and determining, according to a preset determination rule, whether it is necessary to join the second neighbor awareness network device cluster.

The determination rule is specifically: when the CID of the second neighbor awareness network device cluster is greater than the CID of the first neighbor awareness network device cluster, it is necessary to join the second neighbor awareness network device cluster; or the determination rule is specifically: when the CID of the second neighbor awareness network device cluster is less than the CID of the first neighbor awareness network device cluster, it is necessary to join the second neighbor awareness network device cluster.

Preferably, the leaving the first neighbor awareness network device cluster is specifically: not participating in contending for serving as a synchronization device in the first neighbor awareness network device cluster any longer; and the joining the second neighbor awareness network device cluster is specifically: participating in contending for serving as a synchronization device in the second neighbor awareness network device cluster, and being synchronized to a discovery window of the second neighbor awareness network device cluster to perform service discovery.

The processor 22 further has a capability of controlling each interface and other functional components in the wireless device to perform the foregoing operations.

The wireless device in Embodiment 4 has a function of implementing each step in Embodiment 1, which is not repeated herein.

Embodiment 5

Figure 11:
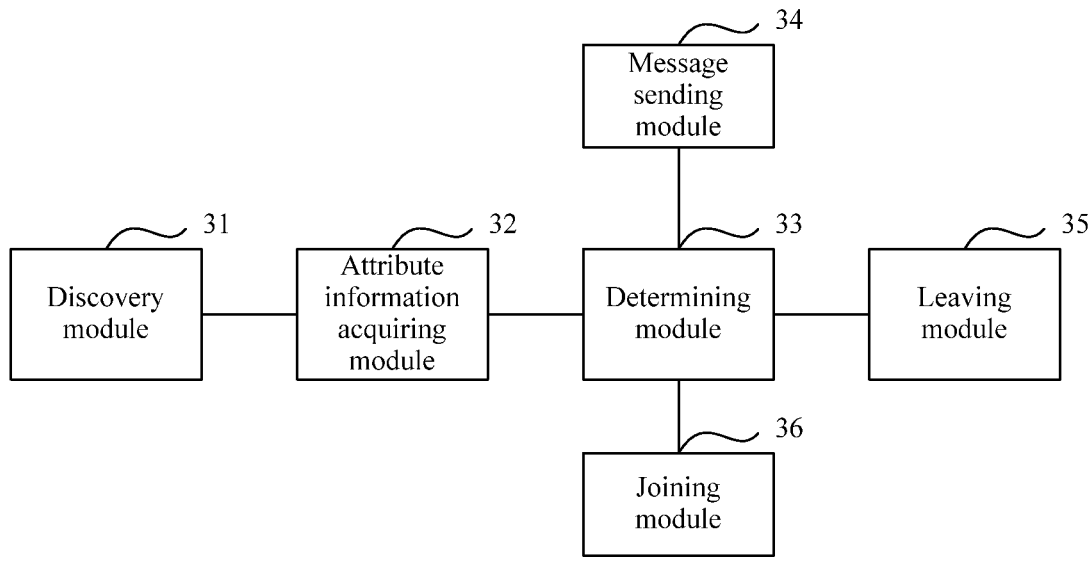
FIG. 11 is a schematic structural diagram of a wireless device according to Embodiment 5 of the present invention.

Embodiment 5 of the present invention describes a wireless device for joining a neighbor awareness network device cluster, which is of a same inventive concept as Embodiment 2. As shown in FIG. 11, the wireless device in a first neighbor awareness network device cluster includes a discovery module 31, an attribute information acquiring module 32, a determining module 33, a message sending module 34, a leaving module 35, and a joining module 36.

The discovery module 31 is configured to discover a neighbor awareness network device cluster. In the solution of Embodiment 5, the discovery module 31 may discover a second neighbor awareness network device cluster according to a manner the same as step 201 in Embodiment 2.

The attribute information acquiring module 32 is configured to acquire attribute information of the second neighbor awareness network device cluster when the discovery module 31 discovers a second neighbor awareness network device cluster. In the solution of Embodiment 5, the attribute information acquiring module 32 may acquire the attribute information of the second neighbor awareness network device cluster according to a manner the same as step 202 in Embodiment 2.

The determining module 33 is configured to compare the attribute information of the second neighbor awareness network device cluster with attribute information of the first neighbor awareness network device cluster to determine whether it is necessary to join the second neighbor awareness network device cluster. In the solution of Embodiment 5, the determining module 33 may determine, according to a manner the same as step 203 in Embodiment 2, whether it is necessary to join the neighbor awareness network device cluster.

The message sending module 34 is configured to send an event message in the first neighbor awareness network device cluster when the determining module 33 determines that it is necessary to join the second neighbor awareness network device cluster, where the event message is about joining the second neighbor awareness network device cluster and includes the attribute information of the second neighbor awareness network device cluster, so that other wireless devices in the first neighbor awareness network device cluster that receive the event message are capable of joining the second neighbor awareness network device cluster according to the attribute information of the second neighbor awareness network device cluster. In the solution of Embodiment 5, the message sending module 34 may send, in the first neighbor awareness network device cluster according to a manner the same as step 204 in Embodiment 2, an event message about joining the second neighbor awareness network device cluster.

The leaving module 35 is configured to leave the first neighbor awareness network device cluster when the determining module 33 determines that it is necessary to join the second neighbor awareness network device cluster.

The joining module 36 is configured to join the second neighbor awareness network device cluster when the determining module 33 determines that it is necessary to join the second neighbor awareness network device cluster.

Preferably, when a cluster identifier included in a received beacon frame or service frame of a neighbor awareness network is different from a locally recorded cluster identifier of the first neighbor awareness network device cluster, the discovery module 31 is specifically configured to determine that the second neighbor awareness network device cluster is discovered; and the attribute information acquiring module 32 is specifically configured to acquire the attribute information of the second neighbor awareness network device cluster from the received beacon frame or service frame of the neighbor awareness network.

The attribute information of the second neighbor awareness network device cluster includes at least one type of the following information:

a CID of the second neighbor awareness network device cluster, the number of wireless devices included in the second neighbor awareness network device cluster, an anchor master rank in the second neighbor awareness network device cluster, a hop count from the wireless device to an anchor master device in the second neighbor awareness network device cluster, and transmission time of a beacon frame of the anchor master device in the second neighbor awareness network device cluster.

Preferably, the determining module 33 is specifically configured to compare the cluster identifier of the second neighbor awareness network device cluster with the locally recorded cluster identifier of the first neighbor awareness network device cluster, and determine, according to a preset determination rule, whether it is necessary to join the second neighbor awareness network device cluster.

The determination rule is specifically: when the CID of the second neighbor awareness network device cluster is greater than the CID of the first neighbor awareness network device cluster, it is necessary to join the second neighbor awareness network device cluster; or the determination rule is specifically: when the CID of the second neighbor awareness network device cluster is less than the CID of the first neighbor awareness network device cluster, it is necessary to join the second neighbor awareness network device cluster.

Preferably, the leaving module 35 is specifically configured not to participate in contending for serving as a synchronization device in the first neighbor awareness network device cluster any longer; and the joining module 36 is specifically configured to participate in contending for serving as a synchronization device in the second neighbor awareness network device cluster, and be synchronized to a discovery window of the second neighbor awareness network device cluster to perform service discovery.

Preferably, the event message is a beacon frame or a service frame of a neighbor awareness network, where the beacon frame or the service frame includes the attribute information of the second neighbor awareness network device cluster; or the event message is a beacon frame or a service frame of a neighbor awareness network, where the beacon frame or the service frame includes merging indication information, and the merging indication information is used to instruct wireless devices in the first neighbor awareness network device cluster that receive the event message to join the second neighbor awareness network device cluster specified by the merging indication information.

The message sending module 34 is specifically configured to: when the determining module 33 determines that it is necessary to join the second neighbor awareness network device cluster, carry the cluster identifier of the second neighbor awareness network device cluster in a destination address field of the beacon frame of the neighbor awareness network, carry the attribute information of the second neighbor awareness network device cluster in an attribute information field of the neighbor awareness network, and send the beacon frame as an event message in the first neighbor awareness network device cluster; or carry the cluster identifier of the second neighbor awareness network device cluster in a destination address field of the service frame of the neighbor awareness network, carry the attribute information of the second neighbor awareness network device cluster in a frame body, and send the service frame as an event message in the first neighbor awareness network device cluster.

The wireless device in Embodiment 5 has a function of implementing step 201 to step 205 in Embodiment 2, which is not repeated herein.

Embodiment 5 of the present invention further describes a wireless device for joining a neighbor awareness network device cluster, which is of a same inventive concept as Embodiment 2. The wireless device in a first neighbor awareness network device cluster includes: a wireless interface and a processor.

The wireless interface is configured to scan a neighbor awareness network device cluster.

The processor is configured to discover a second neighbor awareness network device cluster according to a scanning result of the wireless interface, and acquire attribute information of the second neighbor awareness network device cluster; compare the attribute information of the second neighbor awareness network device cluster with attribute information of the first neighbor awareness network device cluster to determine whether it is necessary to join the second neighbor awareness network device cluster; and when a determination result is that it is necessary to join the second neighbor awareness network device cluster, control the wireless interface to send, in the first neighbor awareness network device cluster, an event message about joining the second neighbor awareness network device cluster, leave the first neighbor awareness network device cluster, and join the second neighbor awareness network device cluster, where the event message includes the attribute information of the second neighbor awareness network device cluster, so that other wireless devices in the first neighbor awareness network device cluster that receive the event message are capable of joining the second neighbor awareness network device cluster according to the attribute information of the second neighbor awareness network device cluster.

Preferably, the wireless interface is specifically configured to scan a beacon frame or a service frame of a neighbor awareness network; and the discovering a second neighbor awareness network device cluster according to a scanning result of the wireless interface, and acquiring attribute information of the second neighbor awareness network device cluster are specifically: when a CID included in a received beacon frame or service frame of a neighbor awareness network is different from a locally recorded CID of the first neighbor awareness network device cluster, determining that the second neighbor awareness network device cluster is discovered; and acquiring the attribute information of the second neighbor awareness network device cluster from the received beacon frame or service frame of the neighbor awareness network.

The attribute information of the second neighbor awareness network device cluster includes at least one type of the following information:

a CID of the second neighbor awareness network device cluster, the number of wireless devices included in the second neighbor awareness network device cluster, an anchor master rank in the second neighbor awareness network device cluster, a hop count from the wireless device to an anchor master device in the second neighbor awareness network device cluster, and transmission time of a beacon frame of the anchor master device in the second neighbor awareness network device cluster.

Preferably, the comparing the attribute information of the second neighbor awareness network device cluster with attribute information of the first neighbor awareness network device cluster to determine whether it is necessary to join the second neighbor awareness network device cluster are specifically: comparing the CID of the second neighbor awareness network device cluster with the locally recorded CID of the first neighbor awareness network device cluster, and determining, according to a preset determination rule, whether it is necessary to join the second neighbor awareness network device cluster.

The determination rule is specifically: when the CID of the second neighbor awareness network device cluster is greater than the CID of the first neighbor awareness network device cluster, it is necessary to join the second neighbor awareness network device cluster; or the determination rule is specifically: when the CID of the second neighbor awareness network device cluster is less than the CID of the first neighbor awareness network device cluster, it is necessary to join the second neighbor awareness network device cluster.

Preferably, the leaving the first neighbor awareness network device cluster is specifically: not participating in contending for serving as a synchronization device in the first neighbor awareness network device cluster any longer; and the joining the second neighbor awareness network device cluster is specifically: participating in contending for serving as a synchronization device in the second neighbor awareness network device cluster, and being synchronized to a discovery window of the second neighbor awareness network device cluster to perform service discovery.

Preferably, the event message is a beacon frame or a service frame of a neighbor awareness network, where the beacon frame or the service frame includes the attribute information of the second neighbor awareness network device cluster; or the event message is a beacon frame or a service frame of a neighbor awareness network, where the beacon frame or the service frame includes merging indication information, and the merging indication information is used to instruct wireless devices in the first neighbor awareness network device cluster that receive the event message to join the second neighbor awareness network device cluster specified by the merging indication information.

The sending, in the first neighbor awareness network device cluster, an event message about joining the second neighbor awareness network device cluster is specifically: carrying the CID of the second neighbor awareness network device cluster in a destination address field of the beacon frame of the neighbor awareness network, carrying the attribute information of the second neighbor awareness network device cluster in an attribute information field of the neighbor awareness network, and controlling the wireless interface to send the frame as an event message in the first neighbor awareness network device cluster; or carrying the CID of the second neighbor awareness network device cluster in a destination address field of the service frame of the neighbor awareness network, carrying the attribute information of the second neighbor awareness network device cluster in a frame body, and controlling the wireless interface to send the frame as an event message in the first neighbor awareness network device cluster.

The processor further has a capability of controlling each interface and other functional components in the wireless device to perform the foregoing operations.

The wireless device in Embodiment 5 has a function of implementing step 201 to step 205 in Embodiment 2, which is not repeated herein.

Embodiment 5 of the present invention describes a wireless device in the first neighbor awareness network device cluster, where the wireless device actively detects and discovers an event message of a second neighbor awareness network device cluster. Embodiment 6 of the present invention further describes a wireless device passively receiving the event message.

Embodiment 6

Figure 12:
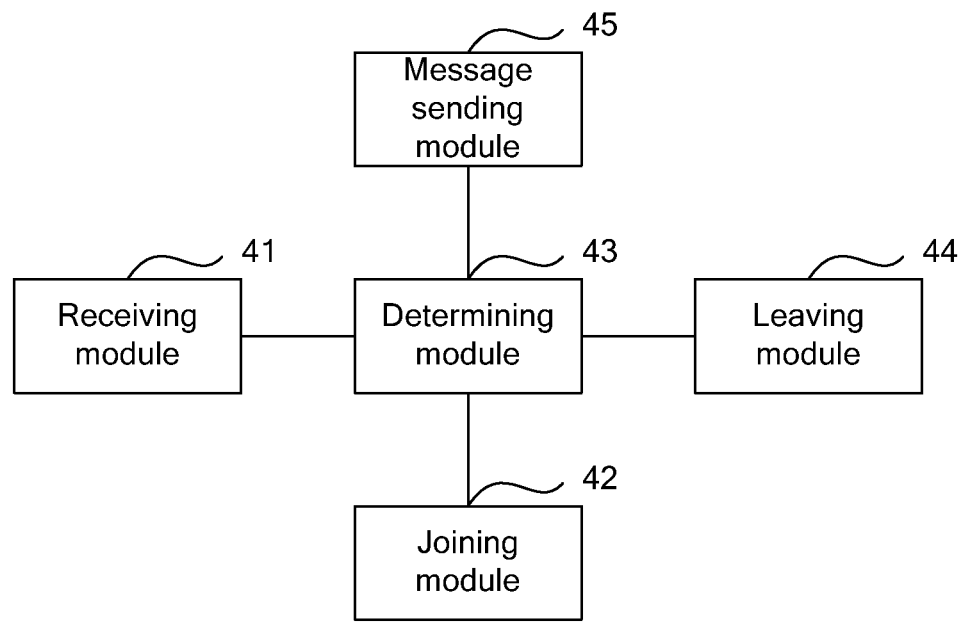
FIG. 12 is a schematic structural diagram of a wireless device according to Embodiment 6 of the present invention.

As shown in FIG. 12, Embodiment 6 of the present invention further describes a wireless device for joining a neighbor awareness network device cluster. The wireless device in a first neighbor awareness network device cluster includes: a receiving module 41 and a joining module 42.

The receiving module 41 is configured to receive an event message about joining a second neighbor awareness network device cluster, where the event message is sent by other wireless devices and includes attribute information of the second neighbor awareness network device cluster.

The joining module 42 is configured to join the second neighbor awareness network device cluster according to the attribute information of the second neighbor awareness network device cluster.

The wireless device in Embodiment 6 may receive the event message and join the second neighbor awareness network device cluster according to the manner of step 206 in Embodiment 2.

Preferably, the wireless device further includes:
a determining module 43, configured to compare a cluster identifier of the second neighbor awareness network device cluster that is included in the event message with a locally recorded cluster identifier of the first neighbor awareness network device cluster, and determine, according to a preset determination rule, whether it is necessary to join the second neighbor awareness network device cluster; and
a leaving module 44, configured to leave the first neighbor awareness network device cluster when the determining module 43 determines that it is necessary to join the second neighbor awareness network device cluster; where
the joining module 42 is specifically configured to join the second neighbor awareness network device cluster when the determining module 43 determines that it is necessary to join the second neighbor awareness network device cluster.

The determination rule is specifically: when the CID of the second neighbor awareness network device cluster is greater than the CID of the first neighbor awareness network device cluster, it is necessary to join the second neighbor awareness network device cluster; or the determination rule is specifically: when the CID of the second neighbor awareness network device cluster is less than the CID of the first neighbor awareness network device cluster, it is necessary to join the second neighbor awareness network device cluster.

Preferably, the wireless device further includes:
a message sending module 45, configured to determine, according to received signal strength of the event message and the number of received event messages, whether to send, in the first neighbor awareness network device cluster, an event message about joining the second neighbor awareness network device cluster, and when determining sending the event message, in the first neighbor awareness network device cluster, send the event message about joining the second neighbor awareness network device cluster.

Preferably, the message sending module 45 is specifically configured to: determine whether the received signal strength of the event message is higher than a first threshold, and if the received signal strength of the event message is higher than the first threshold, in the first neighbor awareness network device cluster, not send the event message about joining the second neighbor awareness network device cluster; or if the received signal strength of the event message is lower than or equal to the first threshold, determine the number of received event messages whose received signal strength is higher than a second threshold, and if the number reaches the threshold, in the first neighbor awareness network device cluster, not send the event message about joining the second neighbor awareness network device cluster, or if the number does not reach the threshold, in the first neighbor awareness network device cluster, send the event message about joining the second neighbor awareness network device cluster; where the first threshold is higher than the second threshold.

In the solution of Embodiment 6 of the present invention, the message sending module 45 may determine, according to the manner of step 207 in Embodiment 2, whether to send, in the first neighbor awareness network device cluster, the event message about joining the second neighbor awareness network device cluster.

The wireless device in Embodiment 6 has a function of implementing step 206 and step 207 in Embodiment 2, which is not repeated herein.

Embodiment 6 of the present invention further describes a wireless device for joining a neighbor awareness network device cluster. The wireless device in a first neighbor awareness network device cluster includes: a wireless interface and a processor.

The wireless interface is configured to receive an event message about joining a second neighbor awareness network device cluster, where the event message is sent by other wireless devices and includes attribute information of the second neighbor awareness network device cluster.

The processor is configured to join the second neighbor awareness network device cluster according to the attribute information of the second neighbor awareness network device cluster.

Preferably, the processor is specifically configured to compare a CID of the second neighbor awareness network device cluster that is included in the event message with a locally recorded CID of the first neighbor awareness network device cluster, and determine, according to a preset determination rule, whether it is necessary to join the second neighbor awareness network device cluster; and when a determination result is that it is necessary to join the second neighbor awareness network device cluster, leave the first neighbor awareness network device cluster, and join the second neighbor awareness network device cluster.

The determination rule is specifically: when the CID of the second neighbor awareness network device cluster is greater than the CID of the first neighbor awareness network device cluster, it is necessary to join the second neighbor awareness network device cluster; or the determination rule is specifically: when the CID of the second neighbor awareness network device cluster is less than the CID of the first neighbor awareness network device cluster, it is necessary to join the second neighbor awareness network device cluster.

Preferably, the processor is further configured to determine, according to received signal strength of the event message and the number of received event messages, whether to send, in the first neighbor awareness network device cluster, an event message about joining the second neighbor awareness network device cluster.

Preferably, the determining, according to received signal strength of the event message and the number of received event messages, whether to send, in the first neighbor awareness network device cluster, an event message about joining the second neighbor awareness network device cluster is specifically: determining whether the received signal strength of the event message is higher than a first threshold; and if the received signal strength of the event message is higher than the first threshold, in the first neighbor awareness network device cluster, not sending the event message about joining the second neighbor awareness network device cluster; or if the received signal strength of the event message is lower than or equal to the first threshold, determining the number of received event messages whose received signal strength is higher than a second threshold, and if the number reaches the threshold, in the first neighbor awareness network device cluster, not sending the event message about joining the second neighbor awareness network device cluster, or if the number does not reach the threshold, in the first neighbor awareness network device cluster, sending the event message about joining the second neighbor awareness network device cluster; where the first threshold is higher than the second threshold.

The processor further has a capability of controlling each interface and other functional components in the wireless device to perform the foregoing operations.

The wireless device in Embodiment 6 has a function of implementing step 206 and step 207 in Embodiment 2, which is not repeated herein.

Embodiment 7

Embodiment 7 of the present invention further describes a system for joining a neighbor awareness network device cluster, which is of a same inventive concept as Embodiment 2. The system includes the wireless device described in Embodiment 5 and the wireless device described in Embodiment 6.

The wireless device in a first neighbor awareness network device cluster is configured to acquire attribute information of the second neighbor awareness network device cluster when discovering a second neighbor awareness network device cluster; compare the attribute information of the second neighbor awareness network device cluster with attribute information of the first neighbor awareness network device cluster to determine whether it is necessary to join the second neighbor awareness network device cluster; and when determining that it is necessary to join the second neighbor awareness network device cluster, in the first neighbor awareness network device cluster, send an event message about joining the second neighbor awareness network device cluster, leave the first neighbor awareness network device cluster, and join the second neighbor awareness network device cluster, where the event message includes the attribute information of the second neighbor awareness network device cluster.

Other wireless devices in the first neighbor awareness network device cluster that receive the event message are configured to join the second neighbor awareness network device cluster according to the attribute information of the second neighbor awareness network device cluster.

The wireless device sending the event message and the wireless device receiving the event message further have functions of implementing each step in Embodiment 2, which is not repeated herein.

Using a schematic diagram of composition of a neighbor awareness network in FIG. 7 as an example, wireless device_1 is a wireless device in the system, which actively discovers a second neighbor awareness network device cluster and sends, in the first neighbor awareness network device cluster, an event message about joining the second neighbor awareness network device cluster, when the wireless device determines it is necessary to join the second neighbor awareness network device cluster. Wireless device_5 to wireless device_10 are wireless devices that passively receive the event message and join the second neighbor awareness network device cluster according to the event message.

Embodiment 8

Figure 13:
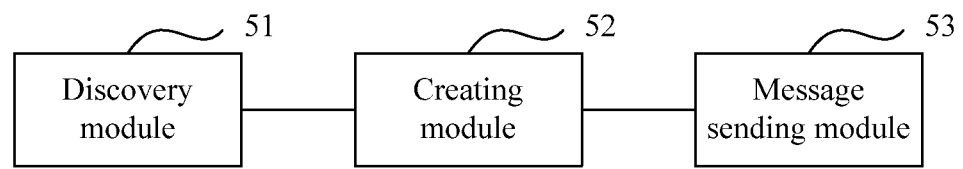
FIG. 13 is a schematic structural diagram of a wireless device according to Embodiment 8 of the present invention.

Embodiment 8 of the present invention describes a wireless device for joining a neighbor awareness network device cluster, which is of a same inventive concept as Embodiment 3. As shown in FIG. 13, the wireless device includes a discovery module 51, a creating module 52 and a message sending module 53.

The discovery module 51 is configured to discover a neighbor awareness network device cluster.

The creating module 52 is configured to create a new neighbor awareness network device cluster when the discovery module 51 discovers multiple neighbor awareness network device clusters.

The message sending module 53 is configured to send, separately in the multiple neighbor awareness network device clusters, an event message about joining the new neighbor awareness network device cluster, where the event message includes attribute information of the new neighbor awareness network device cluster, so that other wireless devices that are in the multiple neighbor awareness network device clusters and receive the event message join the new neighbor awareness network device cluster according to the event message.

Preferably, a CID of the new neighbor awareness network device cluster and CIDs of the multiple neighbor awareness network device clusters meet a preset condition.

The preset condition is specifically: the CID of the new neighbor awareness network device cluster created by the wireless device is greater than the CID of any one of the multiple neighbor awareness network device clusters; or
  the preset condition is specifically: the CID of the new neighbor awareness network device cluster created by the wireless device is less than the CID of any one of the multiple neighbor awareness network device clusters.

Preferably, transmission time of a beacon frame of an anchor master device in the created new neighbor awareness network device cluster is the same as transmission time of a beacon frame of an anchor master device in one of the multiple neighbor awareness network device clusters.

The wireless device in Embodiment 8 has a function of implementing each step in Embodiment 3, which is not repeated herein.

Embodiment 8 of the present invention further describes a wireless device for joining a neighbor awareness network device cluster, which is of a same inventive concept as Embodiment 3. The wireless device includes a wireless interface and a processor.

The wireless interface is configured to scan a neighbor awareness network device cluster.

The processor is configured to create a new neighbor awareness network device cluster when discovering multiple neighbor awareness network device clusters according to the scanning of the wireless interface; and send, separately in the multiple neighbor awareness network device clusters, an event message about joining the new neighbor awareness network device cluster, where the event message includes attribute information of the new neighbor awareness network device cluster, so that other wireless devices that are in the multiple neighbor awareness network device clusters and receive the event message join the new neighbor awareness network device cluster according to the event message.

The processor further has a capability of controlling each interface and other functional components in the wireless device to perform the foregoing operations.

The wireless device in Embodiment 8 has a function of implementing each step in Embodiment 3, which is not repeated herein.

Embodiment 9

Embodiment 9 of the present invention further describes a system for joining a neighbor awareness network device cluster, which is of a same inventive concept as Embodiment 3. The system includes the wireless device described in Embodiment 8 and the wireless device described in Embodiment 6.

The wireless device is configured to create a new neighbor awareness network device cluster when discovering multiple neighbor awareness network device clusters, and send, separately in the multiple neighbor awareness network device clusters, an event message about joining the new neighbor awareness network device cluster, where the event message includes attribute information of the new neighbor awareness network device cluster.

Other wireless devices that are in the multiple neighbor awareness network device clusters and receive the event message are configured to join the new neighbor awareness network device cluster according to the event message.

In this embodiment, the wireless device receiving the event message may be the wireless device described in Embodiment 6.

Using a schematic diagram of composition of a neighbor awareness network shown in FIG. 9 as an example, wireless device_1 is a wireless device in the system, which actively discovers a first neighbor awareness network device cluster and a second neighbor awareness network device cluster and creates a third neighbor awareness network device cluster. Wireless device_2 to wireless device_4 in the first neighbor awareness network device cluster and wireless device_5 to wireless device_10 in the second neighbor awareness network device cluster are wireless devices that passively receive the event message and join the third neighbor awareness network device cluster according to the event message.

A person skilled in the art should understand that the embodiments of the present application may be provided as a method, a system, or a computer program product. Therefore, the present application may adopt a form of hardware only embodiments, software only embodiments, or embodiments in combination of software and hardware. Moreover, the present application may adopt a form of a computer program product that is implemented on one or more computer usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device so that a series of operations and steps are executed on the computer or the other programmable device so as to generate computer-implemented processing. Thereby, the instructions executed on the computer or the other programmable device provide steps for implementing a specific function in one or more processes in the flowcharts and/or in one or more blocks in the block diagrams.

In a typical configuration, the computer device includes one or more processors (CPUs), an input/output interface, a network interface, and a memory. The memory may include such forms as a random access memory (RAM) and/or a non-volatile memory, for example, a read-only memory (ROM) or a flash memory (flash RAM), in computer readable media. The memory is an example of computer readable media. The computer readable media includes perpetual, non-perpetual, removable, and non-removable media, implemented in any method or technology for storage of information. The information may be computer readable instructions, data structures, program modules, or other data.

Examples of computer storage media include, but are not limited to, a phase change memory (PRAM), a static random access memory (SRAM), a dynamic random access memory (DRAM), a random access memory (RAM) of other types, a read-only memory (ROM), an electrically erasable programmable read-only memory (EEPROM), a flash memory or any other memory technology, a compact disc read-only memory (CD-ROM), a digital versatile disk (DVD) or other optical storage, a magnetic cassette, a magnetic tape, magnetic disk storage or other magnetic storage devices, or any other non-transmission medium that can be used to store information for access by a computing device. As defined herein, the computer readable media does not include non-persistent computer readable media (transitory media), for example, a modulated data signal and a carrier wave.

Although some preferred embodiments of the present application have been described, a person skilled in the art can make changes and modifications to these embodiments once learning the basic inventive concept. Therefore, the following claims are intended to be explained as to cover the preferred embodiments and all changes and modifications falling within the scope of the present application.

It is apparent that a person skilled in the art can make various modifications and variations to the present invention without departing from the spirit and scope of the present invention. The present invention is intended to cover these modifications and variations provided that they fall in the scope of protection defined by the following claims or their equivalents.

What is claimed is:

1. A method performed by a wireless network device in a first Neighbor Awareness Network cluster (NAN cluster) to join a second NAN cluster, wherein each of the first and second NAN clusters is a Wi-Fi NAN cluster of Wi-Fi Alliance and comprises a plurality of wireless network devices, the method comprising:
   discovering the second NAN cluster, including obtaining attribute information and a cluster ID (CID) of the second NAN cluster;
   determining to join the second NAN cluster based on the attribute information of the second NAN cluster;
   sending an event message to other wireless network devices in the first NAN cluster, wherein the event message comprises the CID of the second NAN cluster; and
   joining the second NAN cluster, wherein the step of joining comprises: performing service discovery in the second NAN cluster instead of performing service discovery in the first NAN cluster.

2. The method according to claim 1, wherein the step of discovering comprises:
   receiving a beacon frame or service frame including the CID and the attribute information of the second NAN cluster; and
   obtaining the attribute information and the CID of the second NAN cluster from the received beacon frame or service frame.

3. The method according to claim 2, wherein the attribute information of the second NAN cluster comprises at least one of the following types of information:
   a number of wireless network devices in the second NAN cluster, an anchor master rank in the second NAN cluster, a hop count from the wireless network device to an anchor master device in the second NAN cluster, and a transmission time of a beacon frame of the anchor master device in the second NAN cluster.

4. The method according to claim 1, wherein the step of determining comprises:
   calculating, by the wireless network device, a first score based on multiple pieces of attribute information of the first NAN cluster, and a second score based on multiple pieces of attribute information of the second NAN cluster;
   comparing the first score and the second score;
   determining to join the second NAN cluster when the second score is greater than the first score.

5. The method according to claim 1, wherein the event message is:
   a beacon frame or a service frame comprising the CID and the attribute information of the second NAN cluster; or
   a beacon frame or a service frame comprising the CID of the second NAN cluster and merging indication information for instructing the other wireless network devices in the first NAN cluster that receive the event message to join the second NAN cluster.

6. The method according to claim 5, wherein the event message is:

a beacon frame comprising the CID of the second NAN cluster in a destination address field of the beacon frame, and the attribute information of the second NAN cluster in an NAN attribute information field of the beacon frame;
or
a service frame comprising the CID of the second NAN cluster in a destination address field of the service frame, and the attribute information of the second NAN cluster in a frame body of the service frame.

7. A wireless network device comprising:
a memory storing computer executable instructions for the wireless network device in a first Neighbor Awareness Network cluster (NAN cluster) to join a second NAN cluster, wherein each of the first and second NAN clusters is a Wi-Fi NAN cluster of Wi-Fi Alliance and comprises a plurality of wireless network devices;
a processor is configured to execute the computer executable instructions to perform operations of:
discovering the second NAN cluster, including obtaining attribute information and a cluster ID (CID) of the second NAN cluster;
determining to join the second NAN cluster based on the attribute information of the second NAN cluster;
sending an event message to other wireless network devices in the first NAN cluster, wherein the event message comprises the CID of the second NAN cluster; and
joining the second NAN cluster, wherein the operation of joining comprises: performing service discovery in the second NAN cluster instead of performing service discovery in the first NAN cluster.

8. The wireless network device according to claim 7, wherein the operation of discovering comprises:
receiving a beacon frame or service frame including the CID and the attribute information of the second NAN cluster;
and
obtaining the attribute information and the CID of the second NAN cluster from the received beacon frame or service frame.

9. The wireless network device according to claim 8, wherein the attribute information of the second NAN cluster comprises at least one of the following types of information:
a number of wireless network devices in the second NAN cluster, an anchor master rank in the second NAN cluster, a hop count from the wireless network device to an anchor master device in the second NAN cluster, and a transmission time of a beacon frame of the anchor master device in the second NAN cluster.

10. The wireless network device according to claim 7, wherein the operation of determining comprises:
calculating a first score based on multiple pieces of attribute information of the first NAN cluster, and a second score based on multiple pieces of attribute information of the second NAN cluster;
comparing the first score and the second score; and
determining to join the second NAN cluster when the second score is greater than the first score.

11. The wireless network device according to claim 7, wherein the event message is:
a beacon frame or a service frame comprising the CID and the attribute information of the second NAN cluster; or
a beacon frame or a service frame comprising the CID of the second NAN cluster and merging indication information for instructing other wireless network devices in the first NAN cluster that receive the event message to join the second NAN Cluster.

12. The wireless network device according to claim 11, wherein the operation of sending comprises:
placing the CID of the second NAN cluster in a destination address field of a beacon frame and placing attribute information of the second NAN Cluster in an NAN attribute information field of the beacon frame, and sending the beacon frame as the event message; or
placing the CID of the second NAN Cluster in a destination address field of a service frame and placing attribute information of the second NAN Cluster in a frame body of the service frame, and sending the service frame as the event message.

* * * * *

UNITED STATES PATENT AND TRADEMARK OFFICE
CERTIFICATE OF CORRECTION

| | | |
|---|---|---|
| PATENT NO. | : 9,480,013 B2 | Page 1 of 1 |
| APPLICATION NO. | : 14/570429 | |
| DATED | : October 25, 2016 | |
| INVENTOR(S) | : Fang et al. | |

It is certified that error appears in the above-identified patent and that said Letters Patent is hereby corrected as shown below:

In the Drawings

Sheet 7 of 11, in "Fig. 8", in Box "302", Line 1, delete "separately ," and insert -- separately, --, therefor.

In the Specification

In Column 20, Line 22, delete "Ghz" and insert -- GHz --, therefor.

Signed and Sealed this
Twentieth Day of September, 2022

Katherine Kelly Vidal
*Director of the United States Patent and Trademark Office*